United States Patent
Umehara et al.

(10) Patent No.: US 9,324,298 B2
(45) Date of Patent: Apr. 26, 2016

(54) IMAGE PROCESSING SYSTEM, IMAGE PROCESSING APPARATUS, STORAGE MEDIUM HAVING STORED THEREIN IMAGE PROCESSING PROGRAM, AND IMAGE PROCESSING METHOD

(71) Applicant: NINTENDO CO., LTD., Kyoto (JP)

(72) Inventors: Akihiro Umehara, Kyoto (JP); Toshiaki Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/283,502

(22) Filed: May 21, 2014

(65) Prior Publication Data
US 2014/0368426 A1    Dec. 18, 2014

(30) Foreign Application Priority Data
Jun. 13, 2013    (JP) .................................. 2013-124477

(51) Int. Cl.
| | |
|---|---|
| *G06T 11/60* | (2006.01) |
| *G09G 5/12* | (2006.01) |
| *G06F 3/01* | (2006.01) |
| *G06F 3/14* | (2006.01) |
| *G06T 15/20* | (2011.01) |
| *G06T 19/00* | (2011.01) |

(52) U.S. Cl.
CPC .. *G09G 5/12* (2013.01); *G06F 3/01* (2013.01); *G06F 3/1438* (2013.01); *G06T 15/20* (2013.01); *G06T 19/006* (2013.01); *G09G 2380/10* (2013.01)

(58) Field of Classification Search
CPC .......... G06F 3/017; G06F 3/013; G06F 3/01; G06F 3/005; G06F 3/011; G06F 3/014; G06F 3/016; G06F 3/0346
See application file for complete search history.

(56) References Cited

U.S. PATENT DOCUMENTS

| | | | |
|---|---|---|---|
| 8,427,506 B2 | 4/2013 | Kato | |
| 2004/0183926 A1* | 9/2004 | Fukuda et al. | 348/239 |
| 2006/0038833 A1* | 2/2006 | Mallinson et al. | 345/633 |
| 2013/0016123 A1* | 1/2013 | Skarulis | 345/633 |

FOREIGN PATENT DOCUMENTS

JP      2011-258120      12/2011

* cited by examiner

*Primary Examiner* — Olga Merkoulova
(74) *Attorney, Agent, or Firm* — Nixon & Vanderhye P.C.

(57) ABSTRACT

A marker image that, if included in a captured image captured by an image capturing apparatus, performs image processing on the captured image and is thereby allowed to cause a predetermined virtual object to appear is placed in a virtual space. Then, a viewpoint for displaying a part of the virtual space on a display apparatus is changed in accordance with a user input, and the virtual space viewed from the viewpoint is displayed on the display apparatus.

14 Claims, 12 Drawing Sheets

F I G. 2
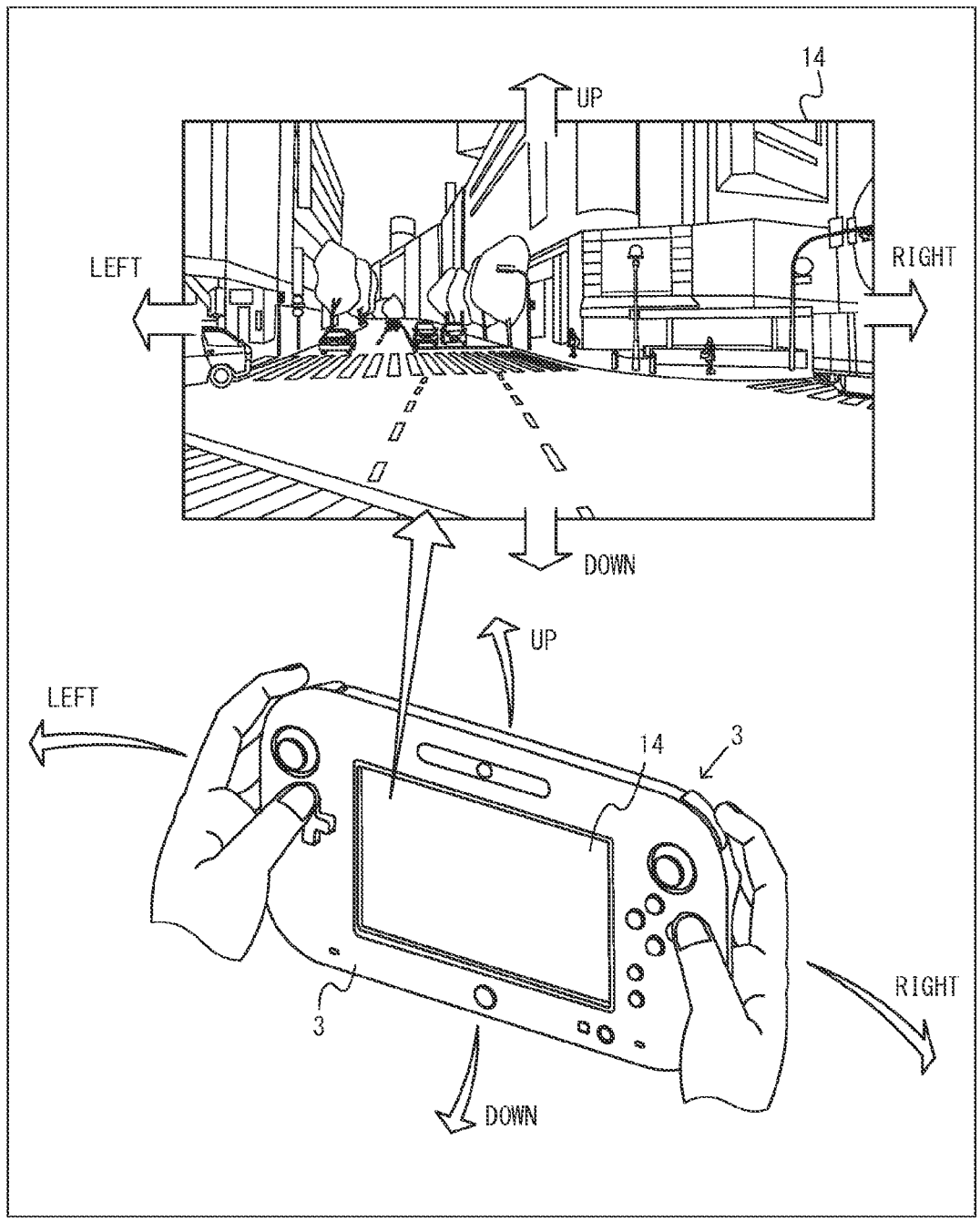

F I G. 1 4
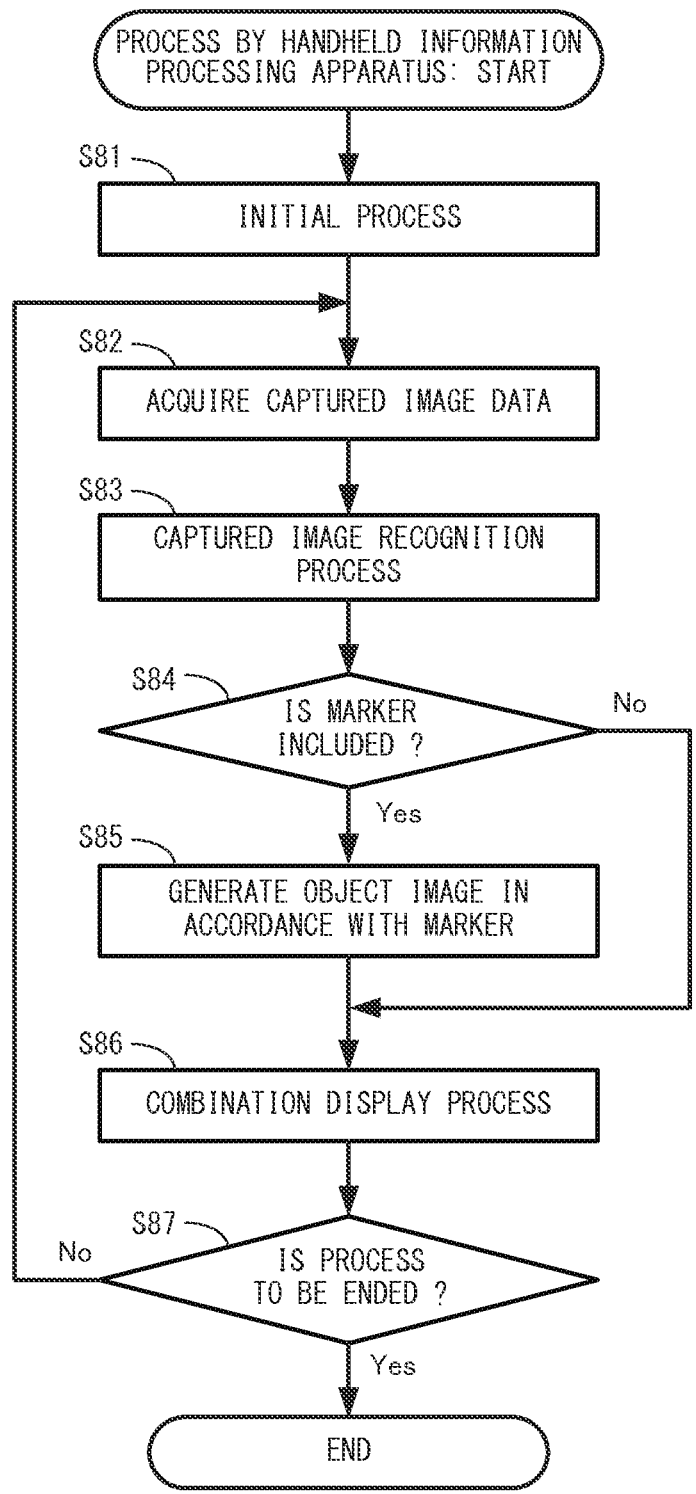

IMAGE PROCESSING SYSTEM, IMAGE PROCESSING APPARATUS, STORAGE MEDIUM HAVING STORED THEREIN IMAGE PROCESSING PROGRAM, AND IMAGE PROCESSING METHOD

CROSS REFERENCE TO RELATED APPLICATION

The disclosure of Japanese Patent Application No. 2013-124477, filed on Jun. 13, 2013, is incorporated herein by reference.

FIELD

The technology shown here relates to an image processing system, an image processing apparatus, a storage medium having stored therein an image processing program, and an image processing method, and in particular, relates to an image processing system, an image processing apparatus, and an image processing method for, for example, displaying a marker image that can cause a virtual object to appear, and a storage medium having stored therein an image processing program for, for example, displaying a marker image that can cause a virtual object to appear.

BACKGROUND AND SUMMARY

Conventionally, there is a technique in which an image processing apparatus captures a marker image, thereby combining a virtual object with a captured image at the position of the marker image in the captured image and displaying the combined image.

The above technique, however, merely displays the virtual object at the position of the marker image in the captured image, and there is room for improvement in the display of an image with enhanced interest.

Therefore, it is an object of an exemplary embodiment to provide an image processing system, an image processing apparatus, and an image processing method that can enhance interest in image processing using a marker image, and a storage medium having stored therein an image processing program that can enhance interest in image processing using a marker image.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an image processing system according to an exemplary embodiment, an image processing system includes a first information processing apparatus for causing an image of a predetermined virtual space to be displayed on a first display apparatus, and a second information processing apparatus for causing an image of real space captured by an image capturing apparatus to be displayed on a second display apparatus. The first information processing apparatus includes: one or more processors configured to: acquire a user input; place in the virtual space a marker image that is allowed to cause a predetermined virtual object to appear; in accordance with the user input, change a viewpoint for displaying a part of the virtual space on the first display apparatus; and display on the first display apparatus the virtual space viewed from the viewpoint. The second information processing apparatus includes: one or more processors configured to: acquire a captured image captured by the image capturing apparatus; if the marker image is included in the captured image, combine a virtual object corresponding to the marker image with the captured image at a position corresponding to the marker image in the captured image; and if the virtual object has been combined, display on the second display apparatus the captured image with which the virtual object has been combined.

It is preferable that an image to be displayed on the first display apparatus should be a virtual space image (for example, a panoramic image) having a viewing angle of 180° or more in one of an up-down direction and a left-right direction. More preferably, the image should be a virtual space image having a viewing angle of 360° in one of the up-down direction and the left-right direction. Further, it is preferable that the viewing angle in the other direction is equal to or greater than the viewing angle of the image to be displayed on the first display apparatus. More preferably, the viewing angle in the other direction should be equal to or greater than twice the viewing angle of the image, 120° or more, 150° or more, or 180°. Further, if the virtual space image is a panoramic image, the image may be captured by an image capturing function of the first information processing apparatus, or may be obtained by loading via a predetermined storage medium or a network an image captured by another apparatus having the function of capturing the image.

Based on the above, if having found a marker image in an image of a virtual space displayed on a first display apparatus, a user of a second information processing apparatus captures the virtual space image in which the marker image is displayed, and thereby can cause a virtual object to appear from the marker image in the virtual space image. Meanwhile, a user operating a first information processing apparatus can change a viewpoint for the virtual space image. The user of the first information processing apparatus changes the viewpoint, and thereby can search the virtual space for the marker image. At this time, the user of the first information processing apparatus can change the viewpoint, and therefore can have the experience of feeling as if searching for the marker image while actually walking in the virtual space. This makes it possible to provide unconventional interest to image processing using a marker image.

Further, in accordance with the user input, a position of the viewpoint may be allowed to be changed so that a distance from the viewpoint to the marker image in the virtual space changes.

Based on the above, in accordance with a user input, the distance between the viewpoint and the marker image changes. This makes it possible to provide unconventional interest of a marker image, which requires the operation of bringing the viewpoint close to the marker image to capture the marker image and cause the virtual object to appear from the marker image.

Further, the virtual space may include a plurality of panoramic images associated with spots on a map. In this case, the marker image may be placed at a predetermined position of the at least one panoramic image associated with at least one of the spots. One of the spots on the map may be selected as a current spot based on the user input and the panoramic image associated with the current spot may be selected from the plurality of panoramic images, thereby changing the viewpoint. In the display on the first display apparatus, an image of, in the panoramic image associated with the current spot, a partial area determined in accordance with a user operation may be displayed on the first display apparatus.

Based on the above, the user can change the viewpoint for the virtual space including a plurality of panoramic images associated with spots on a map and search the panoramic images for the marker image. At this time, the user changes the direction of the line of sight, and thereby can look around and move the viewpoint. Thus, the user can have the experience of feeling as if searching for the marker image while actually walking in real space represented by the map. This makes it possible to provide unconventional interest to image processing using a marker image.

Further, in the display on the first display apparatus, if the marker image is placed at another spot that satisfies a predetermined condition with respect to the current spot, an other spot marker image may be displayed together with the panoramic image associated with the current spot on the first display apparatus, the other spot marker image representing the marker image placed at the other spot when viewed from a viewpoint of the panoramic image at the current spot.

Based on the above, if the marker image is placed at another spot that satisfies a predetermined condition with respect to a current spot, an other spot marker image is displayed at the current spot. Thus, even if the marker image is not placed at the current spot, the other spot marker image that satisfies the predetermined condition is displayed, whereby it is possible to notify the user that the marker image is placed at another spot.

Further, the one or more processors of the first information processing apparatus may be further configured to, based on a direction from the current spot to the other spot on the map, determine a placement position of the other spot marker image in the panoramic image associated with the current spot.

Based on the above, it is possible to allow the user to, based on a placement position of the other spot marker image, recognize the direction in which the marker image is placed when viewed from the current spot.

Further, based on a positional relationship on the map between a viewpoint at the other spot and the marker image placed at the other spot, the placement position of the other spot marker image may be determined in the panoramic image associated with the current spot.

Based on the above, it is possible to, based on the placement position of the other spot marker image, represent more accurately the direction in which the marker image is placed when viewed from the current spot.

Further, based on a distance from the current spot to the other spot calculated based on information indicating a position of a spot on the map, the placement position of the other spot marker image may be determined in the panoramic image associated with the current spot.

Based on the above, it is possible to, based on the placement position of the other spot marker image, represent more accurately the distance at which the marker image is placed when viewed from the current spot.

Further, a direction of the other spot marker image when viewed from the viewpoint at the current spot may be determined so as to represent a direction of the marker image placed at the other spot when viewed from the viewpoint at the current spot.

Based on the above, it is possible to cause the direction of the marker image when viewed from the viewpoint at the current spot to coincide with the direction of the other spot marker image. This makes it possible to make the correspondence between the marker image and the other spot marker image more easily understandable.

Further, it may be determined whether or not the marker image is placed at another spot adjacent to the current spot on the map and/or another spot within a predetermined range from the current spot on the map, and if the marker image is placed, the other spot marker image may be displayed together with the panoramic image associated with the current spot on the first display apparatus.

Based on the above, if the marker image is placed at another spot adjacent to the current spot on the map and/or another spot within a predetermined range from the current spot on the map, the other spot marker image is displayed at the current spot. Thus, it is possible to display the other spot marker image at a spot appropriate for the marker image, for example, such that the marker image is placed at another spot adjacent to the current spot.

Further, the panoramic images may be generated by panoramically photographing the plurality of spots in real space. In this case, a virtual image having a predetermined design may be placed on the panoramically photographed panoramic images in a superimposing manner, thereby placing the marker image.

Based on the above, it is possible to save the trouble of generating a panoramic image by placing an object representing the marker image in real space.

Further, the marker image may be placed in the virtual space in accordance with the user input.

Based on the above, it is possible to place the marker image in accordance with a user input. This makes it possible to cause the virtual object to appear in the virtual space at a position desired by the user.

Further, the exemplary embodiment may be carried out in the forms of an image processing apparatus that can be included in the above image processing system, a storage medium having stored therein an image processing program for causing a computer to execute at least some of the above operations, and an image processing method including the above operations.

According to the exemplary embodiment, a user can change a viewpoint for a virtual space image. The user changes the viewpoint, and thereby can search a virtual space for a marker image, which can cause a predetermined virtual object to appear by, if the marker image is included in a captured image captured by an image capturing apparatus, performing image processing on the captured image. At this time, the user can change the viewpoint, and therefore can have the experience of feeling as if searching for the marker image while actually walking in the virtual space. This makes it possible to provide unconventional interest to image processing using a marker image.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is a diagram showing non-limiting examples of a terminal apparatus 3 and a panoramic image displayed on an LCD 14 of the terminal apparatus 3;

FIG. 14 is a flow chart showing a non-limiting example of a display control process performed by the handheld information processing apparatus 5.

DETAILED DESCRIPTION OF NON-LIMITING EXAMPLE EMBODIMENTS

Figure 1:
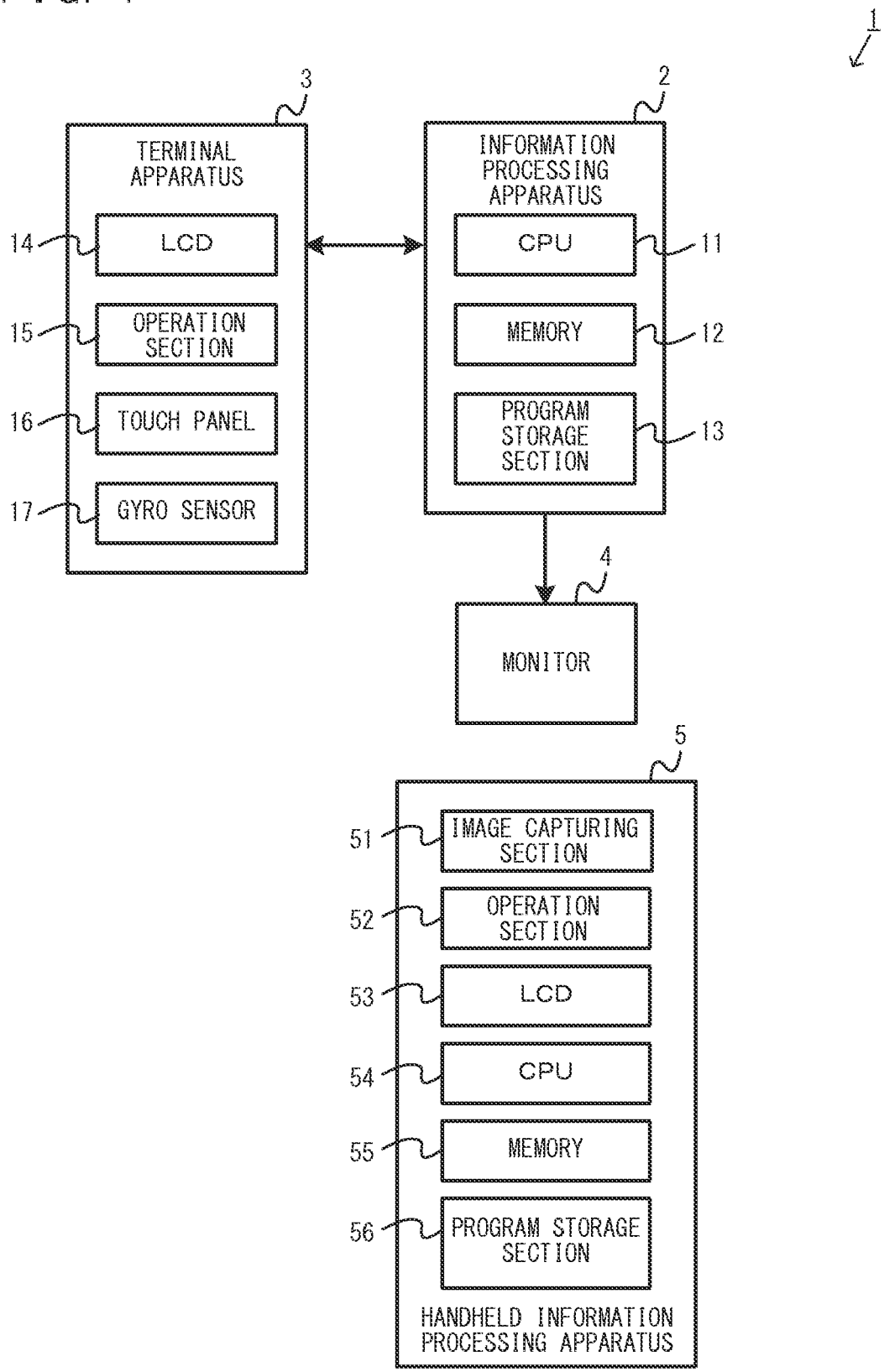
FIG. 1 is a block diagram showing a non-limiting example of an image processing system 1.

With reference to FIG. 1, a description is given of an image processing apparatus for executing an image processing program according to an exemplary embodiment and an image processing system including the image processing apparatus. It should be noted that FIG. 1 is a block diagram showing an example of an image processing system 1 including a stationary information processing apparatus 2 and a handheld information processing apparatus 5.

The information processing apparatus 2 is an example of the image processing apparatus and is composed, for example, of a stationary game apparatus. Then, the information processing apparatus 2 forms a game system including a terminal apparatus 3 and a monitor 4. The information processing apparatus 2 according to the exemplary embodiment generates an image (a panoramic image) and displays the image on each of display apparatuses (the terminal apparatus 3 and/or the monitor 4). The information processing apparatus 2 may be an information processing apparatus in any form such as a personal computer, a game apparatus, a handheld terminal, or a smart phone. The information processing apparatus 2 can communicate with the terminal apparatus 3. The communication between the information processing apparatus 3 and the input device 2 or the television 4 may be performed in a wired or wireless manner. Further, the connection between the information processing apparatus 2 and the monitor 4 may also be made in a wired or wireless manner.

In the information processing apparatus 2, the information processing apparatus 2 executes information processing (a display control process) in accordance with an input to the terminal apparatus 3, and the image obtained as a result of the execution of the information processing is displayed on the terminal apparatus 3 and/or the monitor 4. As described above, the exemplary embodiment uses a configuration in which an input function, an information processing function, and a display function are achieved by a plurality of apparatuses. Alternatively, in another exemplary embodiment, the configuration may be achieved by a single information processing apparatus (for example, a handheld or portable information processing apparatus) having these functions. Yet alternatively, in another exemplary embodiment, the function of the information processing apparatus 2 may be achieved by a plurality of apparatuses. For example, in another embodiment, a plurality of apparatuses capable of communicating with each other via a network (a wide-area network and/or a local network) may perform in a dispersed manner at least part of the information processing performed by the information processing apparatus 2.

As shown in FIG. 1, the information processing apparatus 2 includes a CPU 11, a memory 12, and a program storage section 13. The CPU 11 executes a predetermined display control program, which is an example of the image processing program, using the memory 12, thereby performing a display control process for displaying, for example, a panoramic image on each of the terminal apparatus 3 and/or the monitor 4. It should be noted that the information processing apparatus 2 may have any configuration that can perform the information processing. For example, a part or all of the information processing may be performed by a dedicated circuit.

The program storage section 13 stores the information processing program. The program storage section 13 is any storage device to which the CPU 11 is accessible. The program storage section 13 may be a storage section included in the information processing apparatus 2, such as a hard disk, or may be a storage section attachable to and detachable from the information processing apparatus 2, such as an optical disk.

The terminal apparatus 3 is an input apparatus that can be held by a user (a portable input apparatus). The terminal apparatus 3 is capable of communicating with the information processing apparatus 2. The terminal apparatus 3 transmits operation data representing the operation on the terminal apparatus 3 to the information processing apparatus 2. Further, in the exemplary embodiment, the terminal apparatus 3 includes a display section (an LCD 14), and therefore, the terminal apparatus 3 serves also as a display apparatus. When an image has been transmitted from the information processing apparatus 2, the terminal apparatus 3 displays the image on the LCD 14.

Further, the terminal apparatus 3 includes an input section. The input section is any apparatus that receives an operation of the user and generates operation data representing the operation of the user. In the exemplary embodiment, the terminal apparatus 3 includes an operation section 15, a touch panel 16, and a gyro sensor 17 as the input section. In the exemplary embodiment, the operation section 15 includes operation buttons and sticks. The touch panel 16 is provided on a screen of the display section (LCD) 14. The gyro sensor 17 is an example of an orientation sensor for calculating the orientation of the terminal apparatus 3. For example, in another exemplary embodiment, the terminal apparatus 3 may include an acceleration sensor and/or a magnetic sensor in addition to (or instead of) the gyro sensor 17. Further, the method of calculating the orientation of the terminal apparatus 3 is any method. For example, in another exemplary embodiment, the information processing apparatus 2 may capture the terminal apparatus 3 using an image capturing apparatus and calculate the orientation of the terminal apparatus 3 using the captured image.

The terminal apparatus 3 transmits the operation data generated by the input section to the information processing apparatus 2. The operation data is transmitted from the terminal apparatus 3 to the information processing apparatus 2 repeatedly, for example, once every certain time. The information processing apparatus 2 performs the display control process using the operation data as an input.

The monitor 4 is an example of a display apparatus that displays a generated image and outputs a generated sound. The monitor 4 can receive data transmitted from the information processing apparatus 2. When an image generated by the information processing apparatus 2 has been transmitted to the monitor 4, the monitor 4 displays the image.

It should be noted that the exemplary embodiment uses the terminal apparatus 3 in which a display apparatus and an input apparatus are integrated. Alternatively, in another exemplary embodiment, a display apparatus and an input apparatus may be separately provided. In this case, the terminal apparatus 3 may function only as an input apparatus, and the information processing apparatus 2 may display an image only on the monitor 4.

For example, the handheld information processing apparatus 5 can execute a display control program and a game program stored in a storage medium such as an exchangeable optical disk or an exchangeable memory card, or received from another apparatus. The handheld information processing apparatus 5 according to the exemplary embodiment combines a virtual object with a captured real world image and displays the combined image on a display apparatus (an LCD 53). The handheld information processing apparatus 5 may be a device such as a general personal computer, a stationary game apparatus, a mobile phone, a handheld game apparatus, or a PDA (Personal Digital Assistant).

The handheld information terminal apparatus 5 includes an image capturing section 51, an operation section 52, an LCD 53, a CPU 54, a memory 55, and a program storage section 56. It should be noted that the handheld information terminal apparatus 5 may include one or more apparatuses containing: an information processing apparatus having at least the CPU 54; and another apparatus.

The CPU 54 is an example of information processing means (a computer) for executing various types of information processing. The CPU 54 has the function of, as the various types of information processing, performing processing based on a captured image captured by the image capturing section 51 and an operation of the user performed on the operation section 52, and the like. For example, the above function is achieved by the CPU 54 executing a predetermined program. In the exemplary embodiment, if a predetermined marker image is included in a captured image captured by the image capturing section 51, the CPU 54 performs a display control process for combining a virtual object with the captured image at a display position of the marker image in the captured image, and displaying the combined image on the LCD 53.

The memory 55 stores various types of data for use when the CPU 54 performs the above information processing. The memory 55 is, for example, a memory accessible by the CPU 54.

The program storage section 56 stores a program. The program storage section 56 may be any storage device (storage medium) accessible by the CPU 54. For example, the program storage section 56 may be a storage device provided in the handheld information terminal apparatus 5 having the CPU 54, or may be a storage medium detachably attached to the handheld information terminal apparatus 5 having the CPU 54. Alternatively, the program storage section 56 may be a storage device (a server or the like) connected to the CPU 54 via a network. The CPU 54 may load a part or all of the program into the memory 55 at appropriate timing and execute the loaded program.

The operation section 52 is an input apparatus that can be operated by a user. The operation section 52 may be any input apparatus. For example, the operation section 52 may include an operation button, a stick, a touch panel, and an orientation sensor such as a gyro sensor.

The LCD 53 is an example of a display section included in the handheld information terminal apparatus 5 and displays an image in accordance with an instruction from the CPU 54. It should be noted that the LCD 53 may be a display apparatus capable of displaying a stereoscopically visible image by displaying a left-eye image and a right-eye image using substantially the same display area.

For example, the image capturing section 51 is fixedly provided on the outer surface of a housing of the handheld information processing apparatus 5 such that the image capturing direction of the image capturing section 51 is the depth direction of a screen of the LCD 53. The image capturing section 51 is connected to the CPU 54, captures an image in accordance with an instruction from the CPU 54, and outputs the captured image data to the CPU 54. The image capturing section 51 includes an imaging device (for example, a CCD image sensor or a CMOS image sensor) having a predetermined resolution, and a lens. It should be noted that the lens may have a zoom mechanism. Further, the image capturing section 51 may form a stereo camera including two image capturing sections fixedly provided such that the image capturing directions of the image capturing sections are parallel in the left-right direction.

Next, an overview of the process of displaying an image according to the exemplary embodiment is described. In the exemplary embodiment, the information processing apparatus 2 displays an image of a partial area (an area in the range of field of view based on the direction of the line of sight of the operation of the user) of a panoramic image on the monitor 4. Then, the panoramic image displayed on the monitor 4 is captured using the image capturing section 51 of the handheld information processing apparatus 5. If a predetermined marker image is included in the captured panoramic image, the monitor 4 displaying the panoramic image with which a virtual object has been combined at the display position of the marker image is displayed on the LCD 53.

In the exemplary embodiment, the panoramic image is an image having a range wider than the range displayed on each display apparatus. That is, basically, an image of a partial area of the panoramic image is displayed on the display apparatus. In the exemplary embodiment, in the panoramic image, an area included in the range of field of view determined in accordance with the direction of the line of sight is the range displayed on (the display range of) the display apparatus. The panoramic image can be said to be an image on which the process of determining the display range is performed in accordance with the direction of the line of sight in a three-dimensional space (every time the image is displayed on the display apparatus). The display range may change (move) in accordance with, for example, an operation of the user. If the display range moves, the panoramic image can be said to be an image of which the direction of the line of sight changes in accordance with the change in the display range. As described above, normally, a partial area (range) of the panoramic image is displayed. The information processing apparatus 2, however, may have the function of displaying the entirety of the panoramic image on a display apparatus. For example, if the information processing apparatus 2 displays the panoramic image on a plurality of display apparatuses, some of the display apparatuses may display the entirety of the panoramic image.

It should be noted that the exemplary embodiment uses a panoramic image having a viewing angle in all directions (360°) in each of an up-down direction (a pitch direction) and a left-right direction (a yaw direction). The panoramic image, however, may have a blind spot, and for example, may have a viewing angle of about 180°. An image having a range wider than the range displayed on (the range of field of view of) each display apparatus is a panoramic image.

FIG. 2 is a diagram showing examples of the terminal apparatus 3 and a panoramic image displayed on the LCD 14 of the terminal apparatus 3. As shown in FIG. 2, in the exemplary embodiment, (a partial range of) a panoramic image representing the real world is displayed on the LCD 14 of the terminal apparatus 3.

In the exemplary embodiment, the direction of the line of sight is controlled by the operation of the user changing the orientation of the terminal apparatus 3. For example, as shown in FIG. 2, if the terminal apparatus 3 has rotated in the up-down direction (the pitch direction) or the left-right direction (the yaw direction), the direction of the line of sight of an image displayed on the LCD 14 (the direction of the line of sight of a virtual camera described later) changes upward and downward or to the left and right. That is, the image displayed on the LCD 14 is scrolled upward and downward or to the left and right, and a different range of the panoramic image is displayed. Specifically, the information processing apparatus 2 calculates the orientation of the terminal apparatus 3 based on the angular velocity detected by the gyro sensor 17 and calculates the direction of the line of sight based on the calculated orientation.

As described above, the information processing apparatus 2 controls the direction of the line of sight in accordance with the orientation of the terminal apparatus 3. This enables the user to change the display range of the panoramic image by performing the operation of changing the orientation of the terminal apparatus 3 as if looking around, and to look over the real space represented by the panoramic image. This enables the user to have the experience of feeling as if actually being at the location of the viewpoint of the panoramic image. It should be noted that in the exemplary embodiment, the information processing apparatus 2 matches the amount of change in the orientation of the terminal apparatus 3 with the amount of change in the direction of the line of sight of the panoramic image. This increases the reality of the operation of changing the orientation of the terminal apparatus 3 to look over the real space represented by the panoramic image.

It should be noted that in another exemplary embodiment, the direction of the line of sight may be controlled in any manner. If the direction of the line of sight is controlled by an input provided by the user, the input method is any method. The information processing apparatus 2 may control the direction of the line of sight in accordance with, for example, an input to a directional button or a stick included in the terminal apparatus 3. Alternatively, the direction of the line of sight may be controlled by an input provided by the user, and may also be automatically controlled in accordance with a predetermined algorithm.

Figure 3:
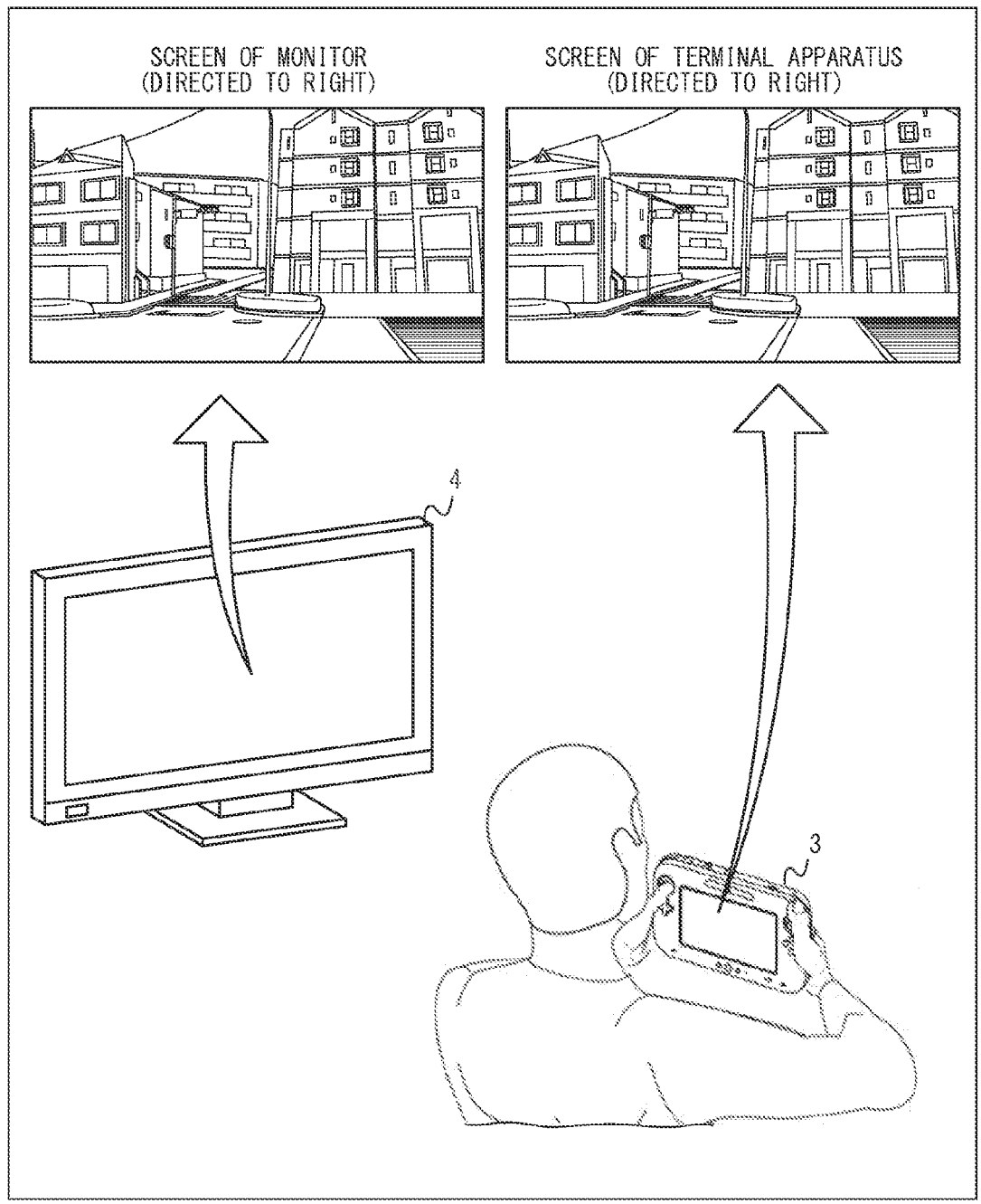
FIG. 3 is a diagram showing non-limiting examples of panoramic images displayed on the LCD 14 of the terminal apparatus 3 and a monitor 4.

FIG. 3 is a diagram showing examples of panoramic images displayed on the LCD 14 of the terminal apparatus 3 and the monitor 4. As shown in FIG. 3, in the exemplary embodiment, the information processing apparatus 2 displays on the monitor 4 the same image as that displayed on the terminal apparatus 3. That is, the monitor 4 displays (a partial range of) a panoramic image representing the real world and changes the display range of the panoramic image in accordance with an operation of the user on the terminal apparatus 3.

In the exemplary embodiment, to display a panoramic image, the information processing apparatus 2 sets a virtual three-dimensional space and places a three-dimensional model in the three-dimensional space. Then, the information processing apparatus 2 displays the panoramic image by the method of drawing a panoramic moving image as a texture on a three-dimensional model.

Figure 4:
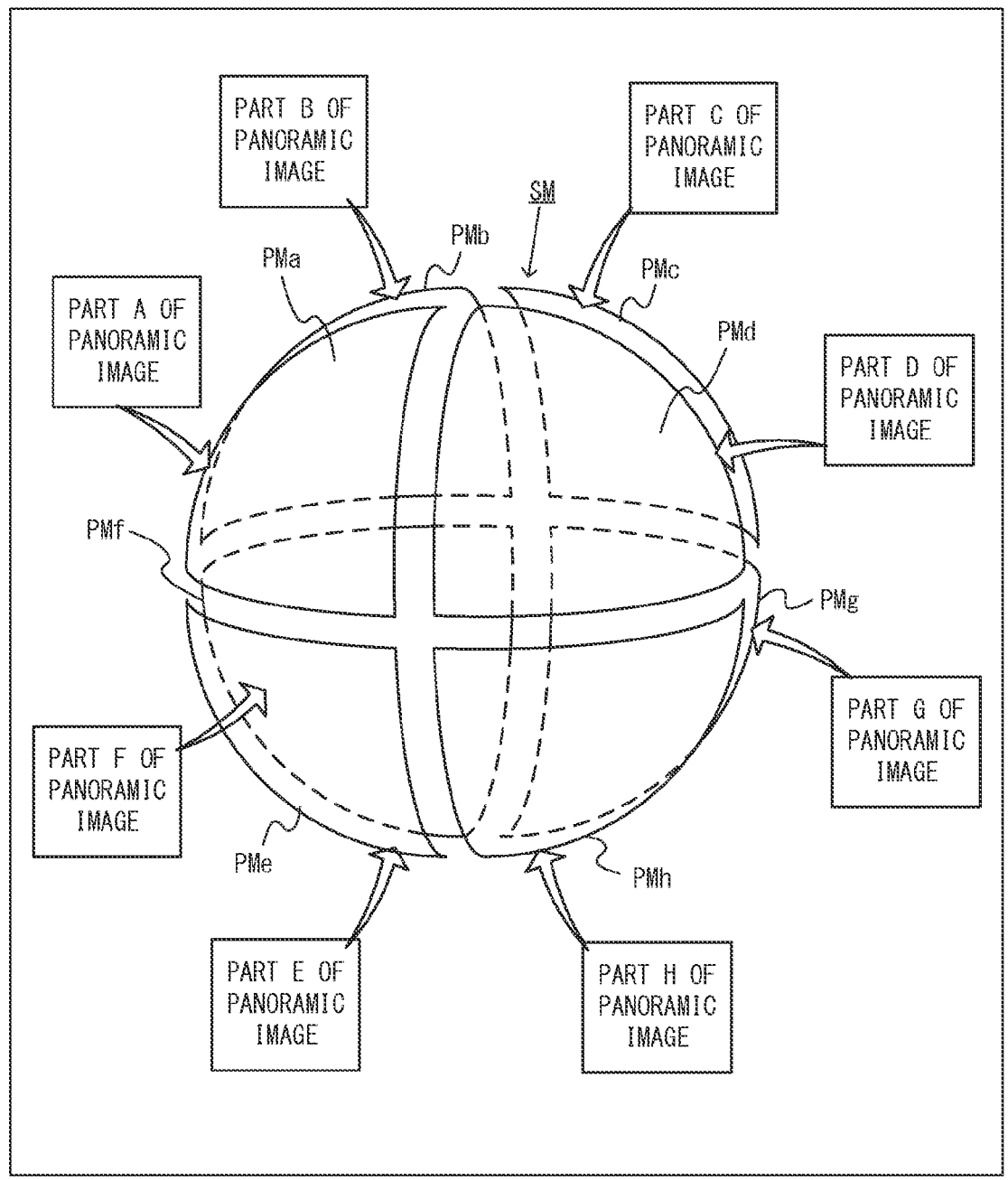
FIG. 4 is a diagram showing a non-limiting example of a three-dimensional model SM, which is placed in a three-dimensional space.

FIG. 4 is a diagram showing an example of a three-dimensional model SM, which is placed in the three-dimensional space. As shown in FIG. 4, in the exemplary embodiment, as the three-dimensional model SM for drawing a panoramic image, eight partial models PMa to PMh are arranged in the three-dimensional space. Each of the partial models PMa to PMh is shaped into a curved surface, which is a part of a spherical surface, so that the partial models PMa to PMh are combined together to form the single spherical three-dimensional model SM. As shown in FIG. 4, the eight partial models PMa to PMh are spherically arranged.

On each of the partial models PMa to PMh, a part of the panoramic image is drawn. Here, the panoramic image is divided in accordance with the number of the partial models PMa to PMh. As an example, the panoramic image is divided into eight portions A to H. Then, the divided panoramic images A to H are drawn on the inner surfaces of the partial models PMa to PMh, respectively.

Figure 5:
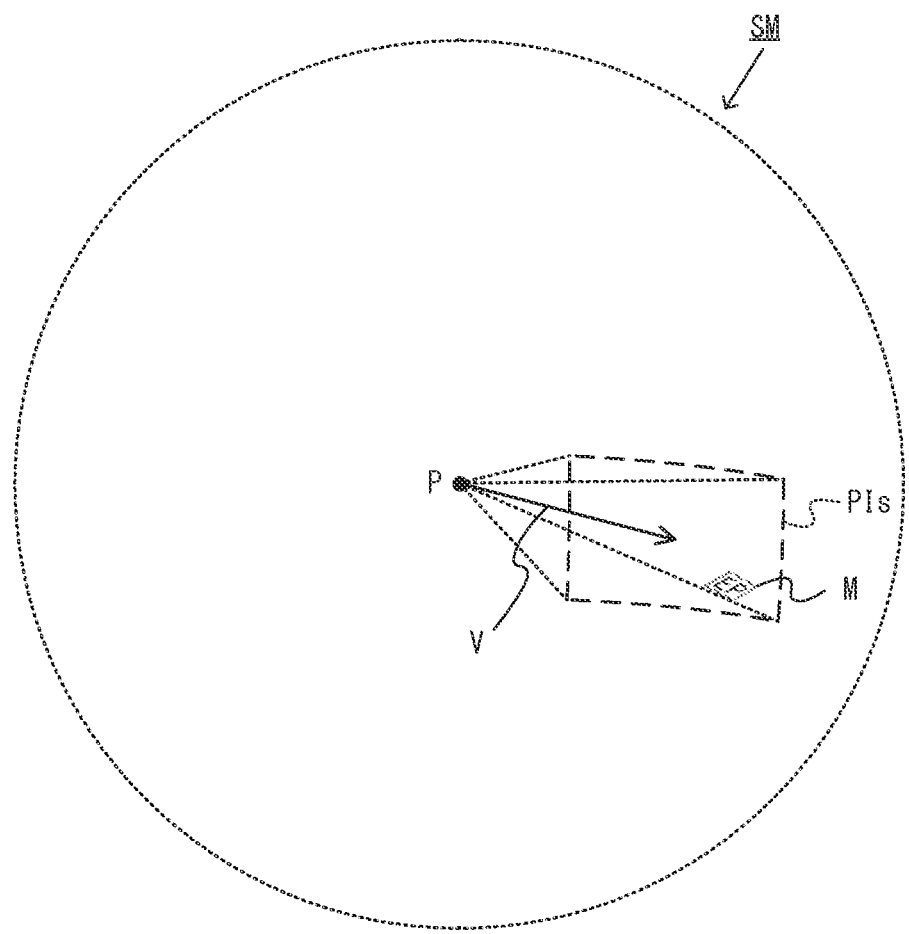
FIG. 5 is a diagram showing a non-limiting example of the three-dimensional space set for displaying a panoramic image.

FIG. 5 is a diagram showing an example of the three-dimensional space set for displaying a panoramic image. It should be noted that hereinafter, a model formed by spherically arranging the eight partial models PMa to PMh is referred to as a "three-dimensional model PM". It should be noted that in FIGS. 5, 9, and 10, to make the figures readily understandable, the shapes of the partial models PMa to PMh to be actually arranged are not shown, and the external shape of the three-dimensional model PM formed by the partial models PMa to PMh is indicated by a dashed line.

The information processing apparatus 2 places a virtual camera inside the three-dimensional model PM. Here, as an example, a virtual camera is placed at a center position P of the three-dimensional model PM. Further, as described above, the direction of the line of sight V of the virtual camera is determined in accordance with the orientation of the terminal apparatus 3. It should be noted that in the exemplary embodiment, the position of the virtual camera is fixed. Alternatively, in another exemplary embodiment, the position of the virtual camera may change in accordance with the direction of the line of sight.

The information processing apparatus 2 generates an image of the three-dimensional model PM (the inner surface of the three-dimensional model PM) viewed from the position P of the virtual camera (the viewpoint) in the direction of the line of sight V. That is, the information processing apparatus 2 generates an image in the range of field of view (a dashed line area PIs shown in FIG. 5) determined based on the direction of the line of sight V in the three-dimensional space (the three-dimensional model PM) and displays the image on each of the display apparatuses (the LCD 14 and the monitor 4). Here, when generating an image, the information processing apparatus 2 draws an image on the inner surface of the three-dimensional model PM using a panoramic image as a texture. That is, a part of a panoramic moving image is drawn on the inner surface of the three-dimensional model PM (some of the partial models PMa to PMh) included in the range of field of view, and an image in the range of field of view is displayed. Consequently, in the panoramic image, an image in a range corresponding to the range of field of view of the virtual camera is generated and displayed.

As described above, the direction of the line of sight V of the virtual camera changes in accordance with an operation of the user. Thus, the range of field of view of the virtual camera changes in accordance with an operation of the user, and a display range corresponding to the range of field of view changes. That is, the panoramic image displayed on each of the LCD 14 and the monitor 4 scrolls in accordance with an operation of the user (see FIGS. 2 and 3).

It should be noted that the range of field of view of the virtual camera is determined by any method based on the direction of the line of sight V. For example, the range of field of view is determined to be a predetermined range about the line of sight in the direction of the line of sight V. It should be noted that the information processing apparatus 2 may change the size of the range of field of view. For example, the information processing apparatus 2 may zoom in or zoom out on the panoramic image displayed on each of the LCD 14 and the monitor 4. The size of the range of field of view may change in accordance with, for example, an operation of the user. Further, the information processing apparatus 2 may rotate the range of field of view in accordance with the change in the orientation of the terminal apparatus 3 in a roll direction.

Further, as shown in FIG. 5, in a virtual space, a marker M may be placed together with the three-dimensional model PM. The marker M is placed inside the three-dimensional model PM. Thus, if the marker M is located in the range of field of view of the virtual camera, the marker M is displayed together with the panoramic image (on top of the panoramic image) on each of the LCD 14 and the monitor 4.

It should be noted that the method of placing the marker M on the panoramic image may not only be the method of placing the marker M in the virtual space as in the exemplary embodiment, but also be any method. For example, in another exemplary embodiment, the information processing apparatus 2 may add an image of the marker M to the panoramic image and draw on the three-dimensional model PM the panoramic image to which the image of the marker M has been added, thereby placing the marker M on the panoramic image.

Further, a marker placed on the panoramic image may be prepared in advance similarly to the panoramic image. That is, data of the panoramic image and data of the marker (image data used to display the marker M and the like) may be stored in advance in the information processing apparatus 2 or in another apparatus (for example, an external server apparatus) capable of communicating with the information processing apparatus 2. In this case, the information processing apparatus 2 acquires these pieces of data where necessary and causes the panoramic image and an image of the marker to be displayed on each of the LCD 14 and the monitor 4, using the acquired pieces of data. It should be noted that the data of the panoramic image and the data of the marker may be stored in apparatuses different from each other. Further, the marker may not only be prepared in advance but also be generated by the user. For example, the user may specify a position on the panoramic image and the type of the marker, and the specified type of marker may be placed at the specified position.

Next, map data used in the exemplary embodiment is described. In the exemplary embodiment, map data is prepared, and a panoramic image is prepared for each of a plurality of spots on a map represented by the map data. Then, the user moves from spot to spot on the map, and thereby can display a plurality of panoramic images different in viewpoint position.

Figure 6:
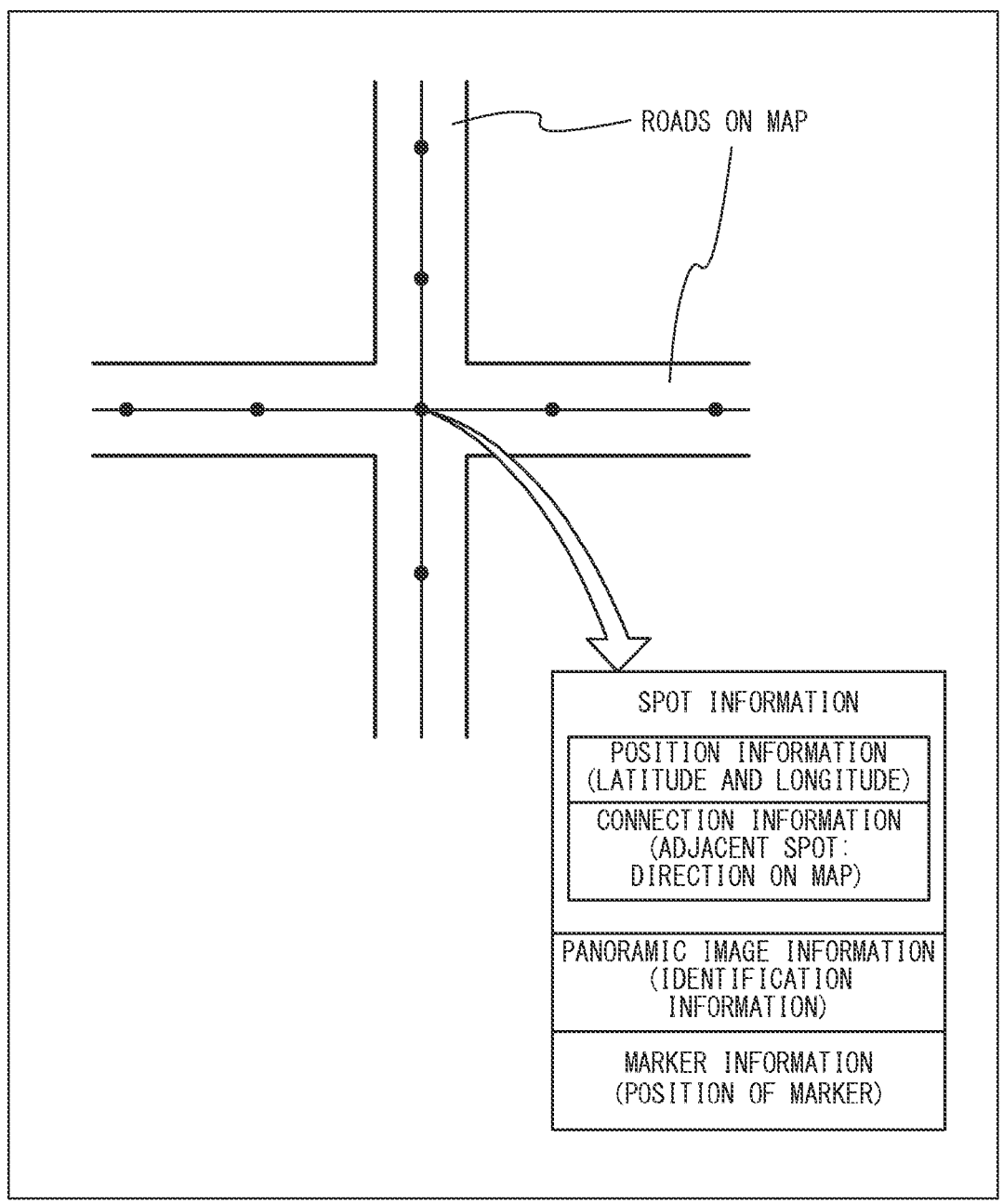
FIG. 6 is a diagram schematically showing a non-limiting example of the configuration of map data.

FIG. 6 is a diagram schematically showing an example of the configuration of the map data. Points shown in FIG. 6 represent spots associated with panoramic images on the map. Further, line segments connecting the points represent the connections between the spots. The map data thus represents the connection relationships between a plurality of spots on the map. The spots in the map data and the connection relationships between the spots may be represented by, for example, nodes representing the spots and links connecting the nodes.

As shown in FIG. 6, in the map data, spot information indicating a spot set on the map is stored with respect to each spot. In the exemplary embodiment, the spot information includes position information and connection information. The position information is information indicating the position of the spot on the map. For example, the position information indicates the latitude and the longitude on the map.

The connection information includes adjacency information indicating another spot (an adjacent spot) connected to the spot. The adjacency information may be information of a node representing the adjacent spot, or may be information of a link representing the connection between the spot and the adjacent spot. Further, in the exemplary embodiment, the connection information includes direction information indicating the direction of the adjacent spot on the map when viewed from the spot. For example, the direction information indicates an angle in the range of $0°≤θ<360°$, the north on the map being $0°$.

As described above, in the map data, each spot is associated with a panoramic image. Specifically, in the map data, panoramic image information is stored in association with the spot information. For example, the panoramic image information is identification information (ID) that enables the identification of each panoramic image. As described above, a plurality of panoramic images are prepared, and each panoramic image is associated with a spot on the map. It should be noted that the panoramic image associated with a certain spot is a panoramic image obtained by, with the certain spot in the real world as a viewpoint, photographing an area around the viewpoint.

Further, markers are set on some of the panoramic images corresponding to the spots on the map (in other words, markers are set at some of the spots on the map). In the exemplary embodiment, there are panoramic images on which markers are set and panoramic images on which markers are not set.

Specifically, in the map data, the panoramic image information is stored in association with marker information. The marker information includes information indicating the position of each marker in the virtual space where the three-dimensional model SM is placed (a position based on the position P of the virtual camera, for example, a position where the marker seems as if being placed on the ground represented by a panoramic image). Further, the marker information may include information indicating the direction of placement of the marker and/or the type of the marker. Further, the marker may be fixedly placed in the virtual space, or may move in the virtual space in accordance with an algorithm determined in advance. If the marker moves, the marker information may include information indicating an algorithm for the movement (or the movement trajectory).

It should be noted that the configuration of the map data is not limited to the above, and the map data may have any configuration in which a panoramic image is associated with a spot, and a marker is set for at least one panoramic image. For example, in another exemplary embodiment, the map data may not include the direction information. Alternatively, the map data may further include information other than the above information. For example, the map data may further include information regarding the altitude of each spot. The information regarding the altitude is, if a spot is set in a building on the map, for example, information indicating what floor of the building the spot is on. As described above, a spot in the map data may not only be a spot on a road but also be a spot in a building.

During the process of displaying the panoramic image, the information processing apparatus 2 receives a line-of-sight change operation and a spot movement operation performed by the user. For example, the line-of-sight change operation is the operation of changing the orientation of the terminal apparatus 3. Further, the spot movement operation is the operation of moving the current spot (viewpoint) for the display of the panoramic image. The specific operation method of the spot movement operation is any method. Direction objects indicating the directions in which the current spot can move may be displayed together with the panoramic image, and the information processing apparatus 2 may receive the operation of specifying a direction object (for example, the operation of touching a direction object on the screen through the touch panel 16). At this time, the current spot moves in the direction indicated by the direction object specified by the user. Further, the information processing apparatus 2 may receive as the spot movement operation the operation performed on the directional button or the sticks included in the terminal apparatus 3. At this time, the current spot moves in the direction specified using the directional button or the sticks.

The information processing apparatus 2 thus causes the panoramic image to be displayed on each of the LCD 14 and the monitor 4 by changing the display range in accordance with the line-of-sight change operation. Further, the information processing apparatus 2 causes the panoramic image associated with the spot after the movement to be displayed on each of the LCD 14 and the monitor 4 in accordance with the spot movement operation. It should be noted that if the spot movement operation has been performed, the position of the virtual camera may not be changed, but the panoramic image to be drawn on the three-dimensional model SM may be changed. That is, the panoramic image of the spot after the movement is drawn on the three-dimensional model SM instead of the panoramic image of the spot before the movement. This makes it possible to display the panoramic image of the spot after the movement. Thus, it seems to the user as if the viewpoint is moving.

Figure 7:
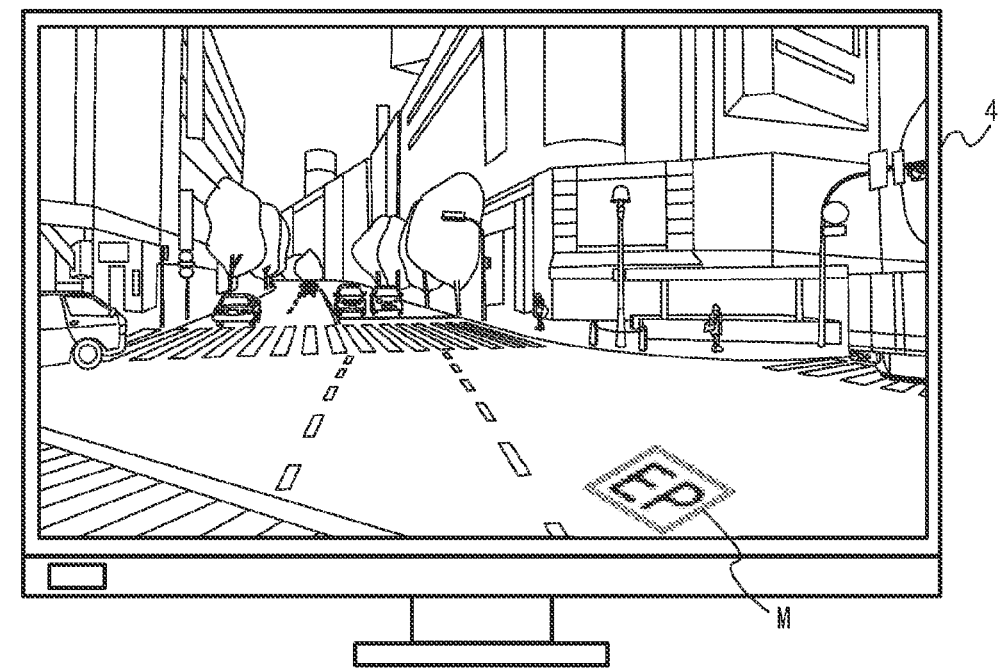
FIG. 7 is a diagram showing a non-limiting example of the state where a handheld information processing apparatus 5 captures an image displayed on the monitor 4.
Figure 7:
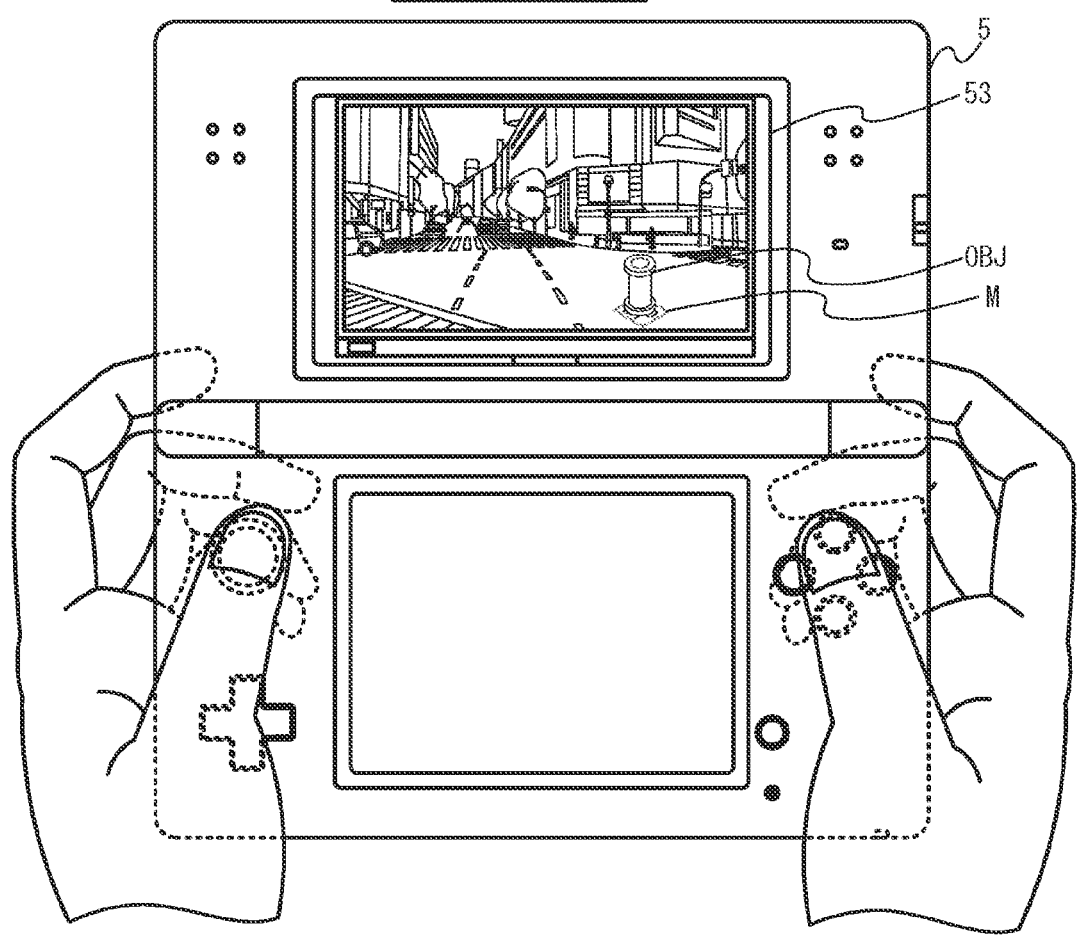

If a marker is set in the panoramic image to be displayed, the information processing apparatus 2 places the marker together with the three-dimensional model SM in the virtual space. A description is given below of the display control process performed by the handheld information processing apparatus 5 when the panoramic image in which a marker is displayed has been displayed on the monitor 4. FIG. 7 is a diagram showing an example of the state where the handheld information processing apparatus 5 is capturing an image displayed on the monitor 4.

As shown in FIG. 7, in the state where the panoramic image in which the marker M is set is displayed (the state where the spot at which the marker is set is the current spot), if the marker M is included in the range of field of view, the marker M is displayed together with the panoramic image on the monitor 4. Then, the display screen of the monitor 4 is captured using the image capturing section 51, whereby the monitor 4 displaying the panoramic image is displayed on the LCD 53 of the handheld information processing apparatus 5.

As an example, letters are written in a rectangular frame in the marker M. The CPU 54 performs image processing such as pattern matching on the captured image acquired from the image capturing section 51, thereby determining whether or not the marker M is included in the captured image. Then, if the marker M has been captured by the image capturing section 51, the panoramic image in which the marker M is displayed in a superimposed manner is displayed as a real world image, and a virtual object OBJ (for example, a virtual object representing an earthenware pipe) is displayed on the LCD 53 in a combined manner at the display position of the marker image M included in the real world image.

It should be noted that directions (a front direction, a right direction, and an up direction) may be defined for the marker M, and the virtual object may be placed in an orientation based on the placement direction of the marker M and displayed in a combined manner. For example, the virtual object may be placed on a plane on which the marker M is placed, such that the front direction of the virtual object coincides with the front direction of the marker M. As an example, the marker M is placed at a position where the marker M seems as if being placed on the ground represented by the panoramic image, such that the front direction of the marker M is directed at the viewpoint P. Thus, the virtual object is placed on the ground and displayed in a combined manner such that the front of the virtual object faces the user viewing the LCD 53. Further, depending on the type of the marker M, the type of the virtual object to be displayed in a combined manner may be changed in accordance with the marker M.

As described above, if having found the marker M in the panoramic image, the user of the handheld information processing apparatus 5 captures the panoramic image in which the marker M is displayed in a combined manner, and thereby can cause the virtual object to appear from the marker M in the panoramic image. Meanwhile, the user operating the terminal apparatus 3 can perform the line-of-sight change operation and the spot movement operation on the panoramic image. The user of the terminal apparatus 3 moves the current spot (viewpoint) while changing the direction of the line of sight, and thereby can search for the marker M. At this time, the user of the terminal apparatus 3 can look around and move the viewpoint by changing the direction of the line of sight, and therefore can have the experience of feeling as if searching for the marker M while actually walking in the real space represented by the map. This makes it possible to provide unconventional interest in image processing using a marker image.

Next, an adjacent spot marker Ma is described. The adjacent spot marker Ma is an image representing the marker M when viewed from the viewpoint at a spot other than a marker placement spot, at which the marker M is placed. For example, at an adjacent spot adjacent to the marker placement spot, the adjacent spot marker Ma representing the marker M when viewed from the viewpoint at the adjacent spot is displayed together with the panoramic image. The display of the adjacent spot marker Ma enables the user to recognize that the marker M is placed at a spot adjacent to the current spot (an adjacent spot is the marker placement spot).

Figure 8:
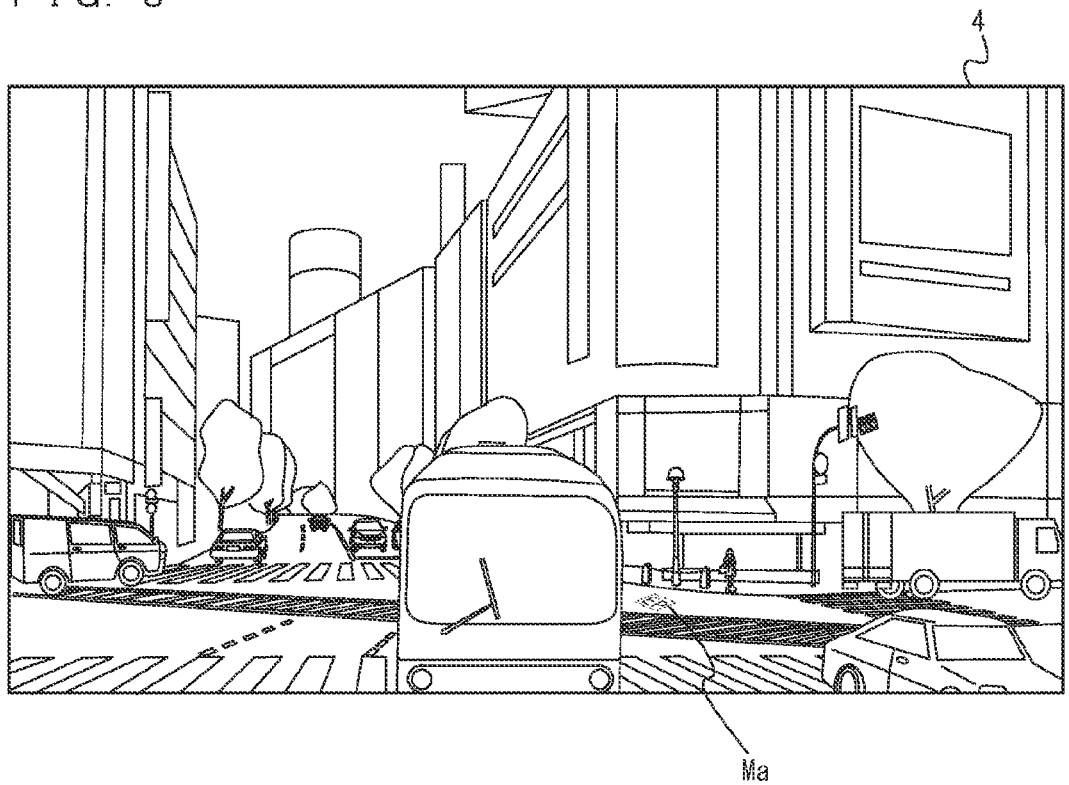
FIG. 8 is a diagram showing a non-limiting example of an adjacent spot marker Ma displayed together with the panoramic image.

FIG. 8 is a diagram showing an example of the adjacent spot marker Ma displayed together with the panoramic image. The image shown in FIG. 8 is an example of the panoramic image displayed on the monitor 4 for an spot adjacent to the marker placement spot when the marker M is placed at the marker placement spot shown in FIG. 7. As shown in FIG. 8, the view of the marker M placed at the marker placement spot from the adjacent spot is superimposed on the panoramic image as the adjacent spot marker Ma at the adjacent spot and displayed. As an example, the adjacent spot marker Ma may have the same design as that of the marker M, and may be obtained by changing the direction, the shape, and/or the size of the displayed marker M in accordance with the direction of viewing the marker M and the distance from the marker M. In this case, even if the adjacent spot marker Ma has the same design as that of the marker M, the handheld information processing apparatus 5 may not be able to recognize the adjacent spot marker Ma as the marker M due to its shape (deformation) and/or its size (reduction). As another example, the adjacent spot marker Ma may have a design different from that of the marker M but related to the marker M (a design that allows the user to recognize the association between the marker M and the adjacent spot marker Ma). In this case, the handheld information processing apparatus 5 cannot recognize the adjacent spot marker Ma as the marker M due to the difference in design, but may recognize the adjacent spot marker Ma as another marker and cause a virtual object different from that of the marker M to appear on the LCD 53.

Figure 9:
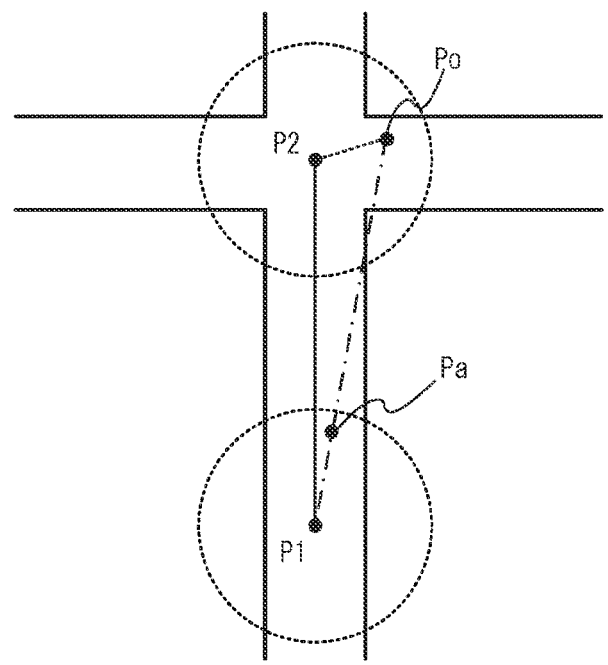
FIG. 9 is a diagram illustrating a non-limiting example of the method of placing the adjacent spot marker Ma by viewing a map space from above.
Figure 10:
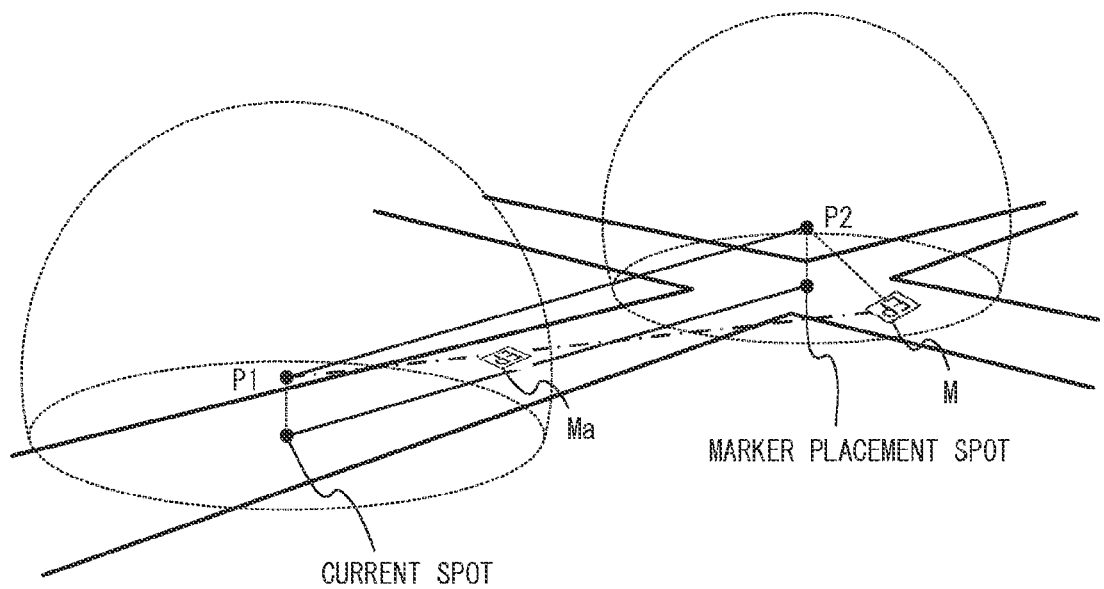
FIG. 10 is a diagram illustrating a non-limiting example of the method of placing the adjacent spot marker Ma by obliquely viewing the map space.

Next, with reference to FIGS. 9 and 10, the method of placing the adjacent spot marker Ma is described. FIG. 9 is a diagram illustrating an example of the method of placing the adjacent spot marker Ma by viewing from above a space represented by the map (hereinafter referred to as a "map space"). FIG. 10 is a diagram illustrating an example of the method of placing the adjacent spot marker Ma by obliquely viewing the map space. It should be noted that the map space shown in FIGS. 9 and 10 conceptually represents the space represented by the map; however, attention should be paid that the map space is different from the virtual space constructed to display the panoramic image (the virtual space where the three-dimensional model SM is set). Further, FIGS. 9 and 10 show a spherical surface corresponding to the three-dimensional model SM for ease of understanding; however, attention should be paid that in the virtual space, the single three-dimensional model SM is placed, and a plurality of three-dimensional models SM are not placed. In another exemplary embodiment, however, a virtual space corresponding to the map space may be set, and a three-dimensional model SM may be set for each spot.

In FIGS. 9 and 10, a position P1 is the position of the viewpoint at the current spot (the position of the viewpoint of the panoramic image associated with the current spot). A position P2 is the position of the viewpoint at the marker placement spot (the position of the viewpoint of the panoramic image associated with the marker placement spot). It should be noted that as shown in FIG. 10, the positional relationship between the spot and the viewpoint is constant in each panoramic image. That is, the viewpoint is placed above the spot by a predetermined distance.

As described above, if the current spot is a spot adjacent to the marker placement spot, the process of placing the adjacent spot marker Ma is performed. In the process of placing the adjacent spot marker Ma, the information processing apparatus 2 calculates the positional relationship in the map space (referred to as a "first positional relationship") between the viewpoint position P1 at the current spot and the viewpoint position P2 at the marker placement spot.

For example, the distance and the direction from the viewpoint position P1 to the viewpoint position P2 in the map space are calculated as the first positional relationship. It should be noted that if the positional relationship between the spot and the viewpoint is constant, the positional relationship between the current spot and the marker placement spot becomes the first positional relationship as it is. Thus, the information processing apparatus 2 determines the direction indicated by the direction information included in the map data, as the direction from the viewpoint position P1 to the viewpoint position P2. Further, as a first example, the information processing apparatus 2 sets the distance from the viewpoint position P1 to the viewpoint position P2 as a predetermined value. In this case, it is possible to speed up the process of placing the adjacent spot marker Ma. As a second example, the information processing apparatus 2 calculates the distance based on latitude/longitude information of the current spot and the marker placement spot included in the map data. In this case, it is possible to calculate the first positional relationship more accurately. As a third example, the information processing apparatus 2 sets the positional relationship between the spot and the viewpoint in advance for each spot (each panoramic image) such that the positional relationship is not constant. In this case, the information processing apparatus 2 may calculate the first positional relationship based on the positional relationship set for each spot and the positional relationship between the current spot and the marker placement spot.

Next, the information processing apparatus 2 determines the positional relationship in the map space (referred to as a "second positional relationship") between the viewpoint position P2 at the marker placement spot and a position Po of the marker M. For example, the second positional relationship is determined based on the distance and the direction from the viewpoint position P2 to the position Po. Specifically, the second positional relationship is determined based on the positional relationship between the virtual camera and the marker M in the virtual space where the three-dimensional model SM is set. It should be noted that the positional relationship in the virtual space is set in advance as the marker information included in the spot information. For example, the direction from the viewpoint position P2 to the position Po in the map space is determined so as to correspond to (coincide with) the direction from the virtual camera to the marker M in the virtual space. Further, the distance from the viewpoint position P2 to the position Po in the map space is determined so as to correspond to the distance from the virtual camera to the marker M in the virtual space. However, the method of determining the distance from the viewpoint position P2 to the position Po is any method, and the distance may be determined as a value determined in advance.

Next, the information processing apparatus 2 calculates a placement position Pa of the adjacent spot marker Ma based on the first positional relationship and the second positional relationship. Specifically, the information processing apparatus 2 calculates the direction from the viewpoint position P1 to the position Po (the direction along a dashed-dotted line shown in FIGS. 9 and 10) based on the first positional relationship and the second positional relationship. The position Pa is determined by setting the position Pa of the adjacent spot marker Ma on a straight line extending from the viewpoint position P1 in the above direction, and determining the distance from the viewpoint position P1 to the position Pa by a method described below.

Here, in the exemplary embodiment, to place the adjacent spot marker Ma inside the three-dimensional model SM set at the current spot, the position Pa is set at a position corresponding to an area inside the three-dimensional model SM. For example, the information processing apparatus 2 sets the distance from the viewpoint position P1 to the position Pa to be a value that has been determined in advance and that is inside the three-dimensional model SM.

It should be noted that the size and the display direction of the adjacent spot marker Ma may be determined in advance. Alternatively, the size and the display direction may be set taking into account the differences between the distance and the direction from the viewpoint position P2 to the marker M, and the distance and the direction from the viewpoint position P1 to the marker M, respectively. This makes it possible to make the adjacent spot marker Ma more realistic as an image representing the marker M. For example, as shown in FIG. 10, if the distance from the viewpoint position P2 to the position Po is longer than the distance from the viewpoint position P1 to the position Po, the adjacent spot marker Ma is set to seem smaller than the marker M in accordance with this difference in distance. Further, the adjacent spot marker Ma is placed at the determined position Pa so as to be parallel with the marker M, and the adjacent spot marker Ma is placed in the same direction as the marker M. That is, the direction (the orientation) of the adjacent spot marker Ma when viewed from the viewpoint position P1 at the current spot is determined so as to represent the direction of the marker M when viewed from the viewpoint position P1 (so as to coincide with the direction of the marker M when viewed from the viewpoint position P1). Specifically, the information processing apparatus 2 determines the direction of the adjacent spot spot marker Ma based on the difference in angle between the direction from the viewpoint position P1 to the position Po of the marker M and the direction from the viewpoint position P2 to the position Po. More specifically, the information processing apparatus 2 determines the direction of the adjacent spot marker Ma as the direction obtained by rotating the direction of the marker M when viewed from the viewpoint position P2 by an amount based on the above difference in angle. As described above, the direction of the marker M when viewed from the viewpoint position P1 is caused to coincide with the direction of the adjacent spot marker Ma, whereby it is possible to make the correspondence between the marker M and the adjacent spot marker Ma more easily understandable. Further, it is possible to increase the reality of the marker M and the adjacent spot marker Ma. It should be noted that in another exemplary embodiment, the direction of the adjacent spot marker Ma may be set to a direction determined in advance, and for example, may be set to the same direction as the direction of the marker M when viewed from the viewpoint position P2.

As described above, if the position Pa of the adjacent spot marker Ma in the map space has been calculated, the information processing apparatus 2 places the adjacent spot marker Ma at a position included in the virtual space and corresponding to the position Pa. Thus, the adjacent spot marker Ma is displayed in the direction from the viewpoint position P1 to the position Po of the marker M (see FIG. 8). As described above, based on the direction from the current spot to another spot (the marker placement spot) on the map, the information processing apparatus 2 determines the placement position of the adjacent spot marker Ma in the panoramic image associated with the current spot. This enables the user to recognize the direction of the marker M when viewed from the current spot, based on the placement position of the adjacent spot marker Ma.

It should be noted that in another exemplary embodiment, the placement position of the adjacent spot marker Ma may be determined using only the direction from the viewpoint position P1 to the viewpoint position P2. Also in this case, it is possible to cause the user to recognize the general direction of the marker M when viewed from the current spot, based on the placement position of the adjacent spot marker Ma. As described above, the adjacent spot marker Ma does not necessarily need to be placed at an accurate position corresponding to the marker M, and may be placed so as to generally indicate the direction from the current viewpoint to the marker M. It should be noted that it goes without saying that if the placement position of the adjacent spot marker Ma is determined based on the positional relationship (the second positional relationship) on the map between the viewpoint (the position P2) at another spot and the marker M (the position Po) in addition to the direction from the current spot to another spot (the marker placement spot) on the map, it is possible to represent the direction of the marker M when viewed from the viewpoint at the current spot more accurately based on the placement position of the adjacent spot marker Ma.

It should be noted that the distance in the first positional relationship may be calculated based on the latitude/longitude information of the current spot and the marker placement spot. That is, the placement position of the adjacent spot marker Ma may be determined based on the distance from the current spot to another spot. This makes it possible to represent the direction of the marker M when viewed from the viewpoint at the current spot more accurately based on the placement position of the adjacent spot marker Ma.

As described above, the information processing apparatus 2 determines whether or not the marker M is present at another spot that satisfies a predetermined condition with respect to the current spot. If the marker M is present, the adjacent spot marker Ma is displayed on each of the terminal apparatus 3 and the monitor 4 together with the panoramic image. This enables the information processing apparatus 2 to display the adjacent spot marker Ma if appropriate, for example, if the marker M is present at a spot adjacent to the current spot. It should be noted that in the above description, the predetermined condition is that the current spot is adjacent to the marker placement spot. The predetermined condition, however, may be any condition. For example, the predetermined condition may be that the marker M is "present within a predetermined distance from the current spot".

Further, even if the user of the handheld information processing apparatus 5 has captured the adjacent spot marker Ma displayed in the panoramic image in a combined manner, it may not be able to cause the virtual object to appear from the adjacent spot marker Ma in the panoramic image, depending on the size, the display direction, the design, the resolution, or the like of the adjacent spot marker Ma. If the adjacent spot marker Ma has been displayed, however, the user operating the terminal apparatus 3 can know that the marker M is placed at a spot in the periphery of the adjacent spot marker Ma. Thus, the user can bring the marker M and the viewpoint close to each other by performing the spot movement operation on the panoramic image. Then, if the viewpoint has come close to a position where the image of the marker M can be recognized, and the panoramic image has been displayed in which the marker M is included in the range of field of view, the user of the handheld information processing apparatus 5 captures the marker M, and thereby can cause the virtual object to appear in the panoramic image from the marker M displayed in the panoramic image in a combined manner. As described above, the user operating the terminal apparatus 3 changes the viewpoint on the panoramic image, and thereby can cause the marker M to be displayed on the monitor 4 so that the user of the handheld information processing apparatus 5 can cause the virtual object to appear on the LCD 53. Thus, it is possible to achieve a game where a user causes the marker M to be displayed in a state suitable for image recognition as if actually walking in the real space represented by the map. This makes it possible to provide unconventional interest in image processing using a marker image.

It should be noted that the placement position and the direction of the adjacent spot marker Ma are determined every time the position of the viewpoint is changed and a new panoramic image is displayed. Alternatively, the placement position and the direction of the adjacent spot marker Ma may be set in advance for the panoramic image. That is, in the map data, information indicating the placement position (and the direction) of the adjacent spot marker Ma may be stored in association with the panoramic image information. At this time, the information processing apparatus 2 displays the adjacent spot marker Ma together with the panoramic image using the information.

Further, the above description has used a panoramic image obtained by capturing the real world, as an example of an image on which a marker is superimposed and which is to be displayed on each of the terminal apparatus 3 and the monitor 4. Alternatively, a marker may be included in another image for display. For example, any image having a range wider than the range displayed on each display apparatus can be used as a display target image so that an image having a display range corresponding to a part of the display target image is displayed on each of the terminal apparatus 3 and the monitor 4. A part of the virtual world or the virtual space may be displayed on each of the terminal apparatus 3 and the monitor 4, and a marker may be placed in the virtual world or the virtual space, whereby it is possible to similarly apply the display control described above.

Further, in the above description, a panoramic image similar to that on the monitor 4 is displayed on the LCD 14 of the terminal apparatus 3. That is, even if the panoramic image in which the marker M is displayed in a combined manner has been displayed on the LCD 14, the virtual object does not appear from the displayed marker M. In another exemplary embodiment, however, if the panoramic image in which the marker M is displayed in a combined manner has been displayed on the LCD 14, a predetermined virtual object may be caused to appear from the displayed marker M. For example, it can be considered that the virtual object to appear on the LCD 14 when the panoramic image in which the marker M is displayed in a combined manner has been displayed on the LCD 14 is the same as the virtual object that appears on the LCD 53 of the handheld information processing apparatus 5 when the marker M has been captured by the image capturing section 51 and subjected to image recognition. Here, the virtual object to appear on the LCD 14 is not displayed in the panoramic image in a combined manner by AR technology. However, representation may be performed such that the same object as the virtual object that appears on the LCD 53 of the handheld information processing apparatus 5 by AR technology may appear from the same marker M. This enables also the user of the terminal apparatus 3 to experience the representation of the appearance of the virtual object in a simulated manner, similarly to the user of the handheld information processing apparatus 5.

Next, a detailed description is given of the processing performed by the information processing apparatus 2. First, with reference to FIG. 11, main data used in the processing is described. It should be noted that FIG. 11 is a diagram showing examples of main data and programs stored in the memory 12 of the information processing apparatus 2.

Figure 11:
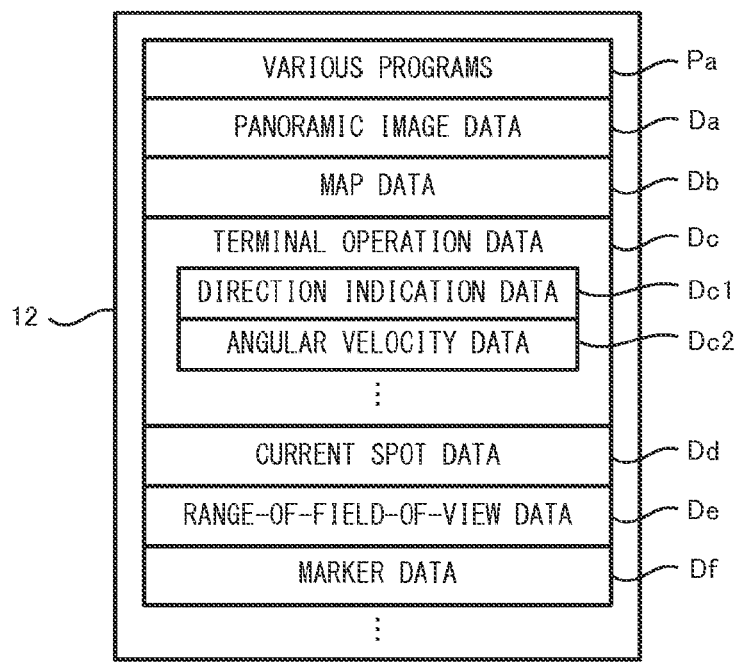
FIG. 11 is a diagram showing non-limiting examples of main data and programs stored in a memory 12 of an information processing apparatus 2.

As shown in FIG. 11, the following are stored in the data storage area of the memory 12: panoramic image data Da; map data Db; terminal operation data Dc; current spot data Dd; range-of-field-of-view data De; marker data Df; and the like. It should be noted that the memory 12 may store, as well as the data shown in FIG. 11, data and the like necessary for the information processing, such as data used in an application to be executed. Further, in the program storage area of the memory 12, various programs Pa included in the display control process program are stored.

The panoramic image data Da is data representing a panoramic image prepared for each of a plurality of spots.

The map data Db is data representing the connection relationships between a plurality of spots on the map and information of each spot and includes the spot information, the panoramic image information, the marker information, and the like described above.

The terminal operation data Dc is data representing the content of the operation performed on the terminal apparatus 3 and includes direction indication data Db1, angular velocity data Dc2, and the like. The direction indication data Db1 is data representing the content of a direction indication operation (the spot movement operation) performed using the operation section 15 and the touch panel 16 provided in the terminal apparatus 3. The angular velocity data Dc2 is data representing the angular velocity generated in the terminal apparatus 3 and is data representing the angular velocity output from the gyro sensor 17.

The current spot data Dd is data representing a spot on the map for displaying a panoramic image.

The range-of-field-of-view data De is data representing the range of field of view in which each of the prepared panoramic images is displayed on each display apparatus.

The marker data Df is data representing the type, the position, the direction, the size, and the like of a marker when the marker is superimposed on each panoramic image for display.

Figure 12:
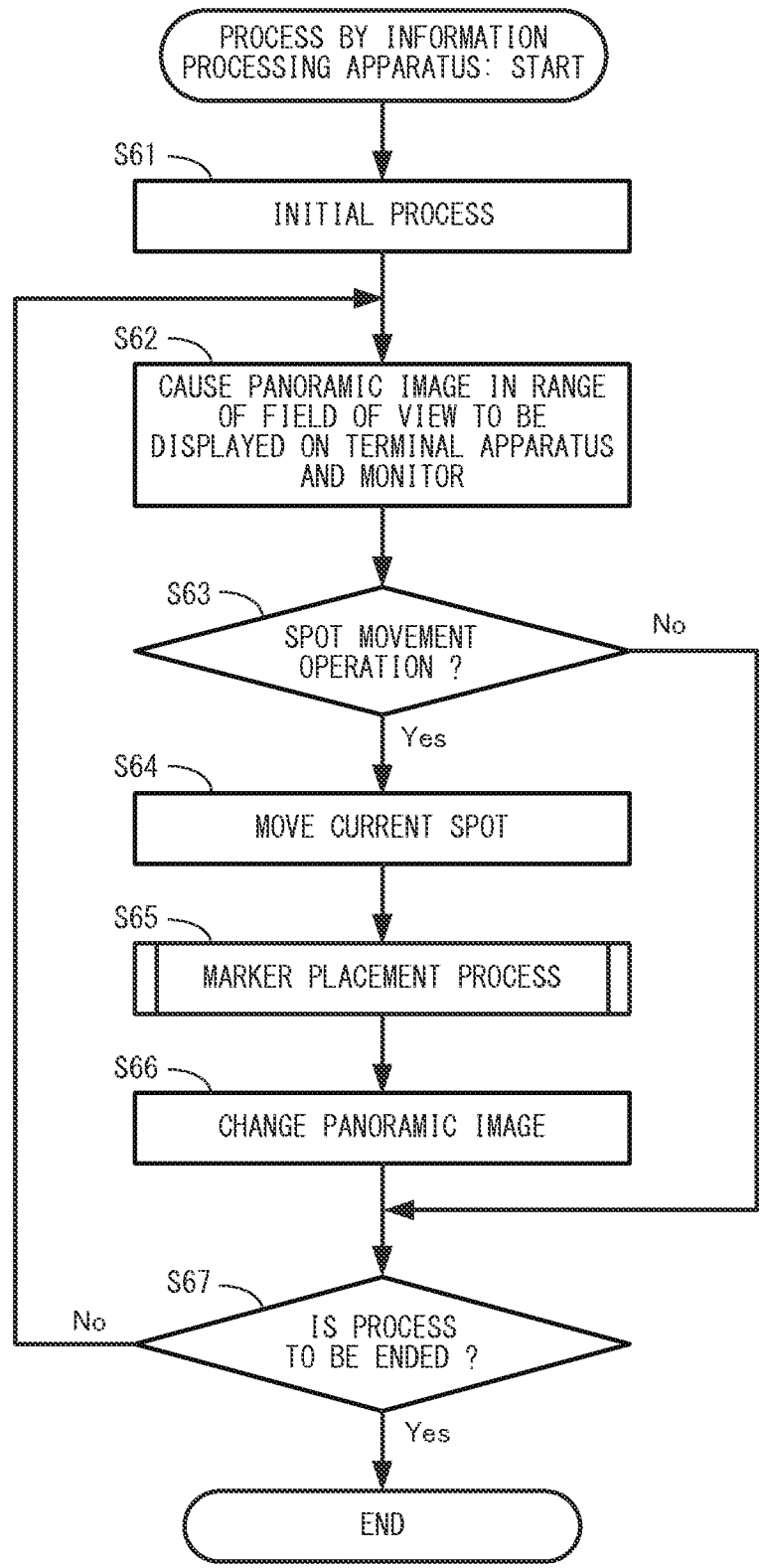
FIG. 12 is a flow chart showing a non-limiting example of a display control process performed by the information processing apparatus 2.
Figure 13:
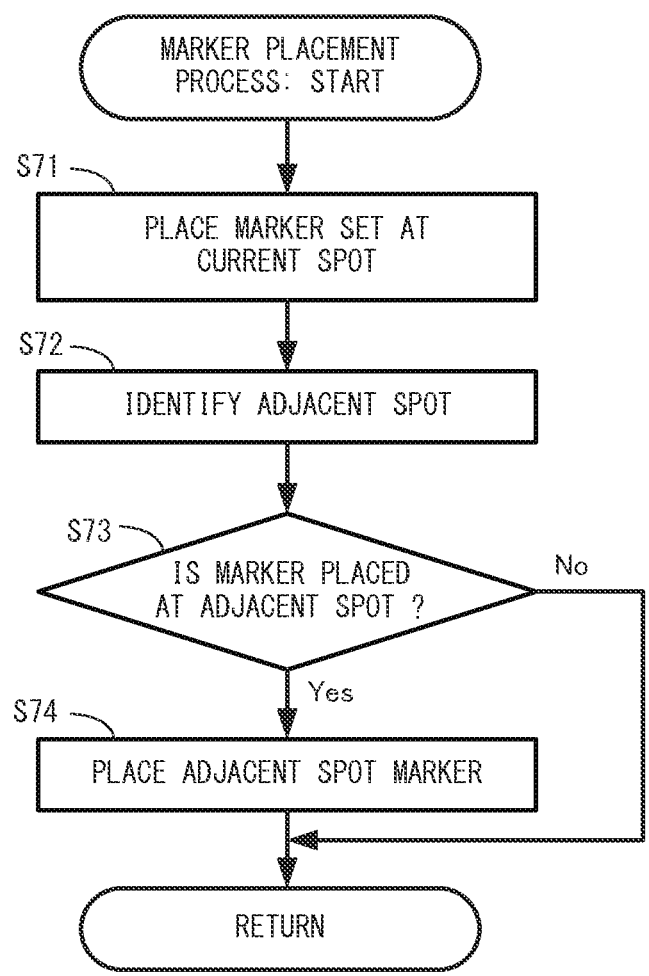
FIG. 13 is a subroutine flow chart showing non-limiting examples of the details of a marker placement process performed in step 65 in FIG. 12.

Next, with reference to FIGS. 12 and 13, the details of the processing performed by the information processing apparatus 2 are described. It should be noted that FIG. 12 is a flow chart showing an example of the display control process performed by the information processing apparatus 2 (the CPU 11). FIG. 13 is a subroutine flow chart showing the details of an example of a marker placement process performed in step 65 in FIG. 12. Here, in the flow charts shown in FIGS. 12 and 13, a description is given mainly of, in the processing performed by the information processing apparatus 2, the process of displaying a panoramic image on each of the terminal apparatus 3 and the monitor 4. Detailed descriptions of other processes not directly related to these processes are omitted. In the exemplary embodiment, a series of processes shown in FIG. 12 are performed by the CPU 11 executing the display control program stored in the program storage section 13.

It should be noted that the display control process shown in FIG. 12 is started at any timing. For example, in accordance with the fact that the user has given an instruction to reproduce a panoramic image, the execution of the display control program may be started. At this time, a part or all of the display control program is loaded into the memory 12 at appropriately timing and executed by the CPU 11. Consequently, the series of processes shown in FIG. 12 are started. It should be noted that the display control program is stored in advance in the program storage section 13 included in the information processing apparatus 2. Alternatively, in another exemplary embodiment, the display control program may be acquired from a storage medium attachable to and detachable from the communication terminal apparatus 2 and stored in the memory 12, or may be acquired from another apparatus via a network such as the Internet and stored in the memory 12.

It should be noted that the processes of all the steps in the flow charts shown in FIGS. 12 and 13 are merely illustrative. Thus, the processing order of the steps may be changed, or another process may be performed in addition to, and/or instead of, the processes of all the steps, so long as similar results are obtained. Further, in the exemplary embodiment, descriptions are given on the assumption that the CPU 11 performs the processes of all the steps in the flow charts.

Alternatively, a processor or a dedicated circuit other than the CPU 11 may perform the processes of some or all of the steps in the flow charts.

In FIG. 12, the CPU 11 performs an initial process (step 61), and the processing proceeds to the next step. For example, the CPU 11 performs as the initial process the process of acquiring the map data and the process of acquiring a panoramic image at a starting spot.

As described above, the map data includes the spot information, the panoramic image information, and the marker information of a plurality of spots. The map data may be acquired from a storage section included in the information processing apparatus 2, or may be acquired from a storage medium attachable to and detachable from the information processing apparatus 2, or may be acquired from another apparatus via a network such as the Internet. Further, the map data to be acquired at the start of the display control process may be the entirety of the map data, or may be data regarding a partial region (for example, a region around the starting spot). It should be noted that the acquired map data is stored as the map data Db in the memory 12.

Further, the CPU 11 selects a starting spot and acquires a panoramic image to be associated with the starting spot. As the starting spot, a spot determined in advance may be selected, or a starting spot may be selected from among a plurality of candidates in accordance with an instruction from the user. At this time, the CPU 11 stores data representing the selected starting spot as the current spot data Dd in the memory 12. Further, the panoramic image may be acquired from a storage section included in the information processing apparatus 2, or may be acquired from a storage medium attachable to and detachable from the information processing apparatus 2, or may be acquired from another apparatus via a network such as the Internet. Further, the CPU 11 places a marker (including an adjacent spot marker) in the virtual space where the three-dimensional model SM is set, by a process similar to a marker placement process (step 65) described later. It should be noted that the panoramic image at the acquired starting spot is stored as the panoramic image data Da in the memory 12.

Next, the CPU 11 sets the range of field of view for the panoramic image, generates, in the panoramic image at the current spot, an image in the range of field of view, and causes the generated image to be displayed on each of the LCD 14 and the monitor 4 (step 62), and the processing proceeds to the next step. Here, the CPU 11 calculates the range of field of view using the method described above in accordance with the orientation of the terminal apparatus 3 and generates a panoramic image in the calculated range of field of view. Specifically, the angular velocity data Dc2 has been updated using terminal operation data transmitted from the terminal apparatus 3 (data representing the angular velocity output from the gyro sensor 17), and the CPU 11 calculates the orientation of the terminal apparatus 3 using the angular velocity indicated by the angular velocity data Dc2. Then, based on the panoramic image data Da, the marker data Df, and the like, the CPU 11 generates a panoramic image in the range of field of view set in accordance with the orientation of the terminal apparatus 3. Then, to cause the generated image to be displayed on each of the LCD 14 and the monitor 4, the CPU 11 outputs (transmits) the generated image to each of the terminal apparatus 3 and the monitor 4. The terminal apparatus 3 and the monitor 4 acquire the generated image and display the generated image on the display screens of the LCD 14 and the monitor 4, respectively. Thus, a part of the panoramic image is displayed on each of the LCD 14 and the monitor 4.

Next, the CPU 11 determines whether or not the spot movement operation has been performed (step 63). Then, if the CPU 11 has determined that the spot movement operation has been performed, the processing proceeds to step 64. If, on the other hand, the CPU 11 has determined that the spot movement operation has not been performed, the processing proceeds to step 67. For example, the direction indication data Dc1 has been updated using terminal operation data transmitted from the terminal apparatus 3 (data representing the content of the operation output from the operation section 15 or the touch panel 16), and the CPU 11 determines, using the content of the operation indicated by the direction indication data Dc1, whether or not the spot movement operation has been performed on the terminal apparatus 3.

In step 64, the CPU 11 moves the current spot, and the processing proceeds to the next step. For example, the CPU 11 determines as a new current spot a spot connected from the current spot indicated by the current spot data Dd in the direction specified by the spot movement operation and updates the current spot data Dd using data representing the new current spot.

Next, the CPU 11 performs a marker placement process (step 65), and the processing proceeds to the next step. The marker placement process is the process of placing in the virtual space a marker to be displayed together with the panoramic image associated with the current spot. With reference to FIG. 13, the details of the marker placement process are described below.

In FIG. 13, the CPU 11 places a marker set at the current spot (step 71), and the processing proceeds to the next step. For example, the CPU 11 places the marker M where necessary. Here, the method of placing the marker M is similar to the method described above. If placing the marker M in the virtual space, the CPU 11 sets the type, the position, the size, the direction, and the like of the marker to be placed and updates the marker data Df. It should be noted that if the marker M to be placed is not present (if the current spot is not the marker placement spot, and the marker M is not set), the process of step 71 may be skipped.

Next, the CPU 11 identifies a spot (an adjacent spot) adjacent to the current spot (step 72), and the processing proceeds to the next step. For example, with reference to the current spot data Dd and the map data Db, the CPU 11 identifies a spot adjacent to the current spot.

Next, the CPU 11 determines whether or not the marker M is placed at the adjacent spot identified in the above step 72. Then, if the CPU 11 has determined that the marker M is placed at the adjacent spot, the processing proceeds to the next step 74. If, on the other hand, the CPU 11 has determined that the marker M is not placed at the adjacent spot, the CPU 11 ends the processing of this subroutine. For example, with reference to the map data Db, the CPU 11 makes the determination based on whether or not the spot adjacent to the current spot is associated with the marker information indicating that the marker M is placed.

In step 74, the CPU 11 places the adjacent spot marker Ma and ends the processing of this subroutine. For example, the method of placing the adjacent spot marker Ma is similar to the method described above. If placing the adjacent spot marker Ma in the virtual space, the CPU 11 sets the type, the position, the size, the direction, and the like of the marker to be placed and updates the marker data Df.

Referring back to FIG. 12, after the marker placement process in the above step 65, the CPU 11 changes the panoramic image to be displayed to the panoramic image associated with the current spot (step 66), and the processing proceeds to step 67. For example, with reference to the map data Db and the current spot data Dd, the CPU 11 acquires the panoramic image information associated with the current spot, acquires a panoramic image corresponding to the information, and updates the panoramic image data Da. It should be noted that also in the process of the above step 66, a panoramic image is acquired similarly to the process of the above step 61. Then, in the above step 62 to be performed next, the panoramic image acquired in step 66 is drawn on the three-dimensional model SM. Thus, in the above step 62 to be performed next, the panoramic image at the spot after the movement is displayed. If the marker M or the adjacent spot marker Ma are placed at the spot after the movement, the marker at the spot after the movement is displayed.

In step 67, the CPU 11 determines whether or not the display control process is to be ended. Examples of conditions for ending the process include the fact that the user has performed the operation of ending the process. If the process is not to be ended, the CPU 11 returns to the above step 62 and repeats the process thereof. If the process is to be ended, the CPU 11 ends the processing indicated in the flow chart. Thereafter, the CPU 11 repeatedly performs the series of processes of steps 62 to 67 until it is determined in step 67 that the process is to be ended.

Next, with reference to FIG. 14, the details of the processing performed by the handheld information processing apparatus 5 are described. It should be noted that FIG. 14 is a flow chart showing an example of the display control process performed by the handheld information processing apparatus 5 (the CPU 54). Here, also in the flow charts shown in FIG. 14, a description is given mainly of, in the processing performed by the handheld information processing apparatus 5, the process of, if a predetermined marker has been detected in a captured image, causing a virtual object to appear and displaying the resulting image on the LCD 53. Detailed descriptions of other processes not directly related to these processes are omitted. In the exemplary embodiment, a series of processes shown in FIG. 14 are performed by the CPU 54 executing the display control program stored in the program storage section 56.

It should be noted that also the display control process shown in FIG. 14 is started at any timing. For example, in accordance with the fact that the user has given an instruction to start the display control process, the execution of the display control program may be started. At this time, a part or all of the display control program is loaded into the memory 55 at appropriately timing and executed by the CPU 54. Consequently, the series of processes shown in FIG. 14 are started. It should be noted that the display control program is stored in advance in the program storage section 56 included in the handheld information processing apparatus 5. Alternatively, in another exemplary embodiment, the display control program may be acquired from a storage medium attachable to and detachable from the handheld information processing apparatus 5 and stored in the memory 55, or may be acquired from another apparatus via a network such as the Internet and stored in the memory 55.

It should be noted that also the processes of all the steps in the flow charts shown in FIG. 14 are merely illustrative. Thus, the processing order of the steps may be changed, or another process may be performed in addition to, and/or instead of, the processes of all the steps, so long as similar results are obtained. Further, in the exemplary embodiment, descriptions are given on the assumption that the CPU 54 performs the processes of all the steps in the flow chart. Alternatively, a processor or a dedicated circuit other than the CPU 54 may perform the processes of some or all of the steps in the flow chart.

In FIG. 14, the CPU 54 performs an initial process in the display control process (step 81), and the processing proceeds to the next step. For example, the CPU 54 initializes parameters used in the display control process in the above step 81.

Next, the CPU 54 acquires captured image data representing a camera image output from the image capturing section 51 (step 82), and the processing proceeds to the next step. For example, the CPU 54 stores captured image data representing a newly acquired captured image in the memory 55.

Next, the CPU 54 performs a captured image recognition process using the captured image data acquired in the above step 82 (step 83) and determines whether or not the marker M is included in the camera image represented by the captured image data (step 84). Then, if the CPU 54 has determined that the marker M is included in the camera image, the processing proceeds to step 85. If, on the other hand, the CPU 54 has determined that the marker M is not included in the camera image, the processing proceeds to step 86. An example of the captured image recognition process performed in the above steps 83 and 84 is described below.

For example, the CPU 54 performs an image recognition process, using a pattern matching technique or the like, on the camera image represented by the captured image data, thereby determining whether or not the marker M is included in the camera image. Then, if the marker M is included in the camera image, the CPU 54 assumes that the marker M exists in the image capturing range of the image capturing section 51 in the real world. Then, based on the position and the orientation of the marker M in the camera image, the CPU 54 calculates the positional relationship between the image capturing section 51 and the marker M. As an example, the CPU 54 recognizes the position and/or the orientation of the marker M in the camera image, thereby calculating a marker-camera transformation matrix, and stores image recognition result data representing the marker-camera transformation matrix in the memory 55.

It should be noted that the marker-camera transformation matrix is a matrix that reflects the position and the orientation of the image capturing section 51 calculated based on the position and the orientation of the marker M in the camera image. More accurately, the marker-camera transformation matrix is a coordinate transformation matrix for transforming coordinates represented by a marker coordinate system (a coordinate system where the position of the marker M in the real world is the origin, and the vertical direction and the horizontal direction of the marker M and a direction normal to the marker M are axes) into coordinates represented by an image capturing section coordinate system based on the position and the orientation of the image capturing section 51 calculated based on the position and the orientation of the marker M in the camera image. Here, in AR (Augmented Reality) technology using a computer, the marker-camera transformation matrix for transforming the marker coordinate system into the image capturing section coordinate system is specified as the view matrix of the virtual camera, whereby it is possible to combine a real world image (a camera image) with a CG image (a virtual world image).

In step 85, in accordance with the marker M in which image recognition has been performed, the CPU 54 generates an object image representing a virtual object to appear, and the processing proceeds to the next step 86. For example, in accordance with the type of the marker M in which image recognition has been performed, the CPU 54 selects a virtual object to appear. Then, the CPU 54 places the virtual object in the virtual space defined by the marker coordinate system (for example, places the virtual object at the origin of the marker coordinate system) and changes the size of the virtual object, where necessary.

For example, in the process of the above step 85, the vertical direction in the marker coordinate system (for example, the negative Y-axis direction) is defined as the vertical direction in the virtual space, and the virtual object is placed in the virtual space. Then, the front, back, left, and right directions of the virtual object are determined based on the front, back, left, and right directions of the marker M. For example, the orientation of the virtual object in the virtual space is controlled so that the front direction of the virtual object coincides with the positive vertical direction (the positive Z-axis direction) in the marker coordinate system, which corresponds to the front direction of the marker M. Then, the virtual object is placed.

Then, the CPU 54 generates as an object image a virtual object viewed from the virtual camera and stores the virtual object in the memory 55. For example, the CPU 54 specifies the marker-camera transformation matrix as the view matrix of the virtual camera, and thereby can display a CG model (a virtual object) represented by the marker coordinate system at the same position as the location where the CG model would be displayed on the LCD 53 if the CG model existed in the real world (for example, on the marker M in the camera image). That is, in the display image displayed on the LCD 53, it is possible to display a virtual object placed in the virtual space defined by the marker coordinate system, as if the virtual object exists in association with the marker M in the real world.

In step 86, the CPU 54 performs a combination display process, and the processing proceeds to the next step. For example, if the marker M has been captured, the CPU 54 generates a display image by combining the captured image (the real world image) acquired in the above step 82 with the object image acquired in the above step 85 and displays the display image on the LCD 53.

Specifically, the CPU 54 draws the captured image (the camera image) acquired in the above step 82 in a predetermined storage area (hereinafter referred to as a "frame buffer") in a VRAM for temporarily storing an image to be supplied to the LCD 53. Then, if the determination is affirmative in the above step 84, the CPU 54 overwrites in the frame buffer the object image stored in the memory 55 (that is, an image of the virtual space viewed from the virtual camera). This results in combining the object image with the camera image (the real world image) drawn in the frame buffer. Then, the image drawn in the frame buffer is supplied to the LCD 53 at predetermined timing and is displayed on the LCD 53. It should be noted that the background of the virtual space is transparent in the object image. Thus, the combination of the object image with the real world image results in generating an image as if the virtual object exists on the real world image. It should be noted that if the determination is negative in the above step 84, the CPU 54 draws only the camera image in the frame buffer and displays the resulting image on the LCD 53.

Next, the CPU 54 determines whether or not the display control process is to be ended. Examples of conditions for ending the process include the fact that the user has performed the operation of ending the process. If the process is not to be ended, the CPU 54 returns to the above step 82 and repeats the process thereof. If the process is to be ended, the CPU 54 ends the processing indicated in the flow chart. Thereafter, the CPU 54 repeatedly performs the series of processes of steps 82 to 87 until it is determined in step 87 that the process is to be ended.

It should be noted that as described above, the user may specify a position in the panoramic image and the type of the marker for causing the virtual object to appear, and the specified type of the marker may be placed at the specified position. In this case, the user may display on each of the terminal apparatus 3 and the monitor 4 a panoramic image at the spot at which the user wishes to place the marker, and may perform a pointing operation or the like on the displayed panoramic image. This may enable the user to set the placement position of the marker. Further, the user may set the type of the marker to be placed, the orientation of the marker to be placed, the size of the marker, and the like by the direction indication operation or the like. If the marker has thus been placed at a predetermined position in the panoramic image as a result of the setting by the user, the marker information included in the map data may be updated based on the setting by the user. This makes it possible to display on each of the terminal apparatus 3 and the monitor 4 also the marker set by the user similarly by the display control process described above.

In addition, the terminal apparatus 3 described above functions as a so-called thin client terminal, which does not perform the series of processes described with reference to FIGS. 12 and 13 or the information processing performed by the information processing apparatus 2. The terminal apparatus 3, however, may be an apparatus having the function of performing predetermined information processing (game processing) by a predetermined program (a game program), such as a handheld game apparatus. It should be noted that the terminal apparatus 3 or another apparatus other than the terminal apparatus 2 may perform at least some of the series of processes performed by the information processing apparatus 2 in the above exemplary embodiment. For example, if the information processing apparatus 2 is further configured to communicate with another apparatus other than the terminal apparatus 3 (for example, another server, another game apparatus, or another mobile terminal), the other apparatus may cooperate to perform the processing steps in the processing. Another apparatus may thus perform at least some of the processing steps in the processing, which enables processing similar to that described above. Further, the processing described above can be performed by a processor or the cooperation of a plurality of processors, the processor and the plurality of processors contained in an information processing system including at least one information processing apparatus. Further, in the exemplary embodiment, the processing indicated in the flow chart described above is performed by the CPU 11 of the information processing apparatus 2 executing a predetermined game program. Alternatively, some or all of the game processing indicated in the flow chart may be performed by a dedicated circuit included in the information processing apparatus 2.

Here, the above variations make it possible to achieve the exemplary embodiment also by a system form such as cloud computing, or a system form such as a distributed wide area network or a local area network. For example, in a system form such as a distributed local area network, it is possible to execute the above processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

In addition, the processing orders, the setting values, the conditions used in the determinations, and the like that are used in the information processing described above are merely illustrative. Thus, it goes without saying that the exemplary embodiment can be achieved also with other orders, other values, and other conditions.

In addition, the above programs may be supplied to the information processing apparatus 2 and the handheld information processing apparatus 5 not only through an external storage medium such as an optical disk storage medium or the external memory, but also through a wired or wireless communication link. Further, the program may be stored in advance in a non-volatile storage device included in the information processing apparatus 2 and a non-volatile storage device of the handheld information processing apparatus 5. It should be noted that examples of an information storage medium having stored therein the program may include, as well as CD-ROMs, DVDs, optical disk storage media similar to these, and non-volatile memories, flexible disks, hard disks, magneto-optical disks, and magnetic tapes. Alternatively, an information storage medium having stored therein the program may be a volatile memory for storing the program. It can be said that such a storage medium is a storage medium readable by a computer or the like. For example, it is possible to provide the various functions described above by causing a computer or the like to load an information processing program stored in the storage medium and execute it.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an image processing system, an image processing apparatus, an image processing program, an image processing method, and the like in order, for example, to enhance the interest in image processing using a marker image.

What is claimed is:

1. An image processing system including a first information processing apparatus for causing an image of a predetermined virtual space to be displayed on a first display apparatus, and a second information processing apparatus for causing an image of real space captured by an image capturing apparatus to be displayed on a second display apparatus,
   the first information processing apparatus comprising:
   one or more processors configured to:
   acquire a user input;
   place in the virtual space a marker image that is allowed to cause a corresponding predetermined virtual object to appear;
   in accordance with the user input, change a viewpoint for displaying a part of the virtual space on the first display apparatus; and
   display on the first display apparatus the virtual space viewed from the changed viewpoint,
   the second information processing apparatus comprising:
   one or more processors configured to:
   acquire a captured image captured by the image capturing apparatus;
   if the marker image is included in the captured image, combine the virtual object corresponding to the marker image with the captured image at a position corresponding to the marker image in the captured image; and
   if the virtual object has been combined, display on the second display apparatus the captured image with which the virtual object has been combined.

2. The image processing system according to claim 1, wherein
   in accordance with the user input, a position of the viewpoint is allowed to be changed so that a distance from the viewpoint to the marker image in the virtual space changes.

3. The image processing system according to claim 1, wherein
   the virtual space includes a plurality of panoramic images associated with spots on a map, the marker image is placed at a predetermined position of at least one panoramic image associated with at least one of the spots, one of the spots on the map is selected as a current spot based on the user input, and the panoramic image associated with the current spot is selected from the plurality of panoramic images, thereby changing the viewpoint, and in the display on the first display apparatus, an image of, in the panoramic image associated with the current spot, a partial area determined in accordance with a user operation is displayed on the first display apparatus.

4. The image processing system according to claim 3, wherein in the display on the first display apparatus, if the marker image is placed at another spot that satisfies a predetermined condition with respect to the current spot, another spot marker image is displayed together with the panoramic image associated with the current spot on the first display apparatus, the other spot marker image representing the marker image placed at the other spot when viewed from a viewpoint of the panoramic image at the current spot.

5. The image processing system according to claim 4, wherein the one or more processors of the first information processing apparatus are further configured to, based on a direction from the current spot to the other spot on the map, determine a placement position of the other spot marker image in the panoramic image associated with the current spot.

6. The image processing system according to claim 5, wherein based on a positional relationship on the map between a viewpoint at the other spot and the marker image placed at the other spot, the placement position of the other spot marker image is determined in the panoramic image associated with the current spot.

7. The image processing system according to claim 6, wherein based on a distance from the current spot to the other spot calculated based on information indicating a position of a spot on the map, the placement position of the other spot marker image is determined in the panoramic image associated with the current spot.

8. The image processing system according to claim 5, wherein a direction of the other spot marker image when viewed from the viewpoint at the current spot is determined so as to represent a direction of the marker image placed at the other spot when viewed from the viewpoint at the current spot.

9. The image processing system according to claim 4, wherein it is determined whether or not the marker image is placed at another spot adjacent to the current spot on the map and/or another spot within a predetermined range from the current spot on the map, and if the marker image is placed, the other spot marker image is displayed together with the panoramic image associated with the current spot on the first display apparatus.

10. The image processing system according to claim 3, wherein the panoramic images are generated by panoramically photographing the plurality of spots in real space, and a virtual image having a predetermined design is placed on the panoramically photographed panoramic images in a superimposing manner, thereby placing the marker image.

11. The image processing system according to claim 1, wherein the marker image is placed in the virtual space in accordance with the user input.

12. An image processing apparatus for causing an image of a predetermined virtual space to be displayed on a display apparatus, the image processing apparatus comprising:

one or more processors configured to:
acquire a user input;
place in the virtual space a marker image that is captured by an image capturing apparatus and is thereby allowed to cause a corresponding predetermined virtual object to appear in a captured image;
in accordance with the user input, change a viewpoint for displaying a part of the virtual space on the display apparatus; and
display on the display apparatus the virtual space viewed from the changed viewpoint.

13. A non-transitory computer-readable storage medium having stored therein an image processing program to be executed by a computer included in an information processing apparatus for causing an image of a predetermined virtual space to be displayed on a display apparatus, the image processing program causing the computer to execute:

acquiring a user input;
placing in the virtual space a marker image that is captured by an image capturing apparatus and is thereby allowed to cause a corresponding predetermined virtual object to appear in a captured image;
in accordance with the user input, changing a viewpoint for displaying a part of the virtual space on the display apparatus; and
displaying on the display apparatus the virtual space viewed from the changed viewpoint.

14. An image processing method to be executed by a processor or a cooperation of a plurality of processors, the processor or the plurality of processors contained in an image processing system including a first information processing apparatus for causing an image of a predetermined virtual space to be displayed on a first display apparatus, and a second information processing apparatus for causing an image of real space captured by an image capturing apparatus to be displayed on a second display apparatus, the image processing method comprising:

acquiring a user input;
placing in the virtual space a marker image that is allowed to cause a corresponding predetermined virtual object to appear;
in accordance with the user input, changing a viewpoint for displaying a part of the virtual space on the first display apparatus; and
displaying on the first display apparatus the virtual space viewed from the changed viewpoint,
acquiring a captured image captured by the image capturing apparatus;
if the marker image is included in the captured image, combining the virtual object corresponding to the marker image with the captured image at a position corresponding to the marker image in the captured image; and if the virtual object has been combined, displaying on the second display apparatus the captured image with which the virtual object has been combined.

\* \* \* \* \*